| United States Patent [19] | [11] Patent Number: 5,033,987 |
| Bloch | [45] Date of Patent: Jul. 23, 1991 |

[54] SKINNING AND CUTTING KNIFE

[76] Inventor: David R. Bloch, 2888 Bluff St., Suite 130, Boulder, Colo. 80301

[21] Appl. No.: 590,546

[22] Filed: Sep. 27, 1990

Related U.S. Application Data

[63] Continuation of Ser. No. 490,507, Mar. 1, 1990, abandoned, which is a continuation of Ser. No. 276,248, Nov. 25, 1988, abandoned.

[51] Int. Cl.$^5$ ................................................ B26B 3/00
[52] U.S. Cl. ...................................... 452/132; 30/314
[58] Field of Search .................. 452/125, 132; 30/294, 30/308, 314, 351, 356

[56] References Cited

U.S. PATENT DOCUMENTS 4,283,854  8/1981  Austin ..................................... 30/314
4,477,943 10/1984  Grush, Jr. ............................... 17/75

Primary Examiner—Willis Little
Attorney, Agent, or Firm—Rothgerber, Appel, Powers & Johnson

[57] ABSTRACT

A knife for skinning and cutting animal carcasses or the like having a blade and a handle inclined relative to the blade with upper and lower handle portions located on opposite sides of a blade portion and a rearwardly inclined skinning slot on the blade.

4 Claims, 18 Drawing Sheets

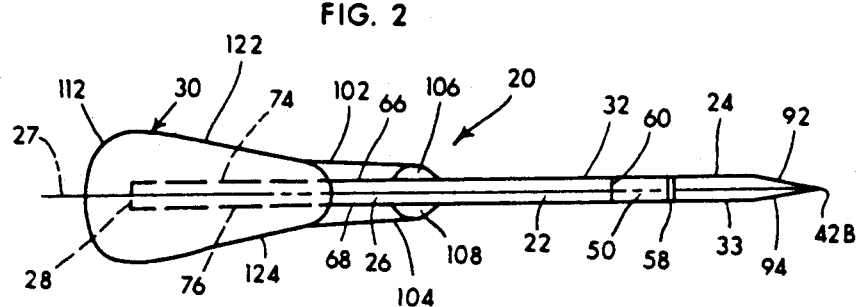
FIG. 2
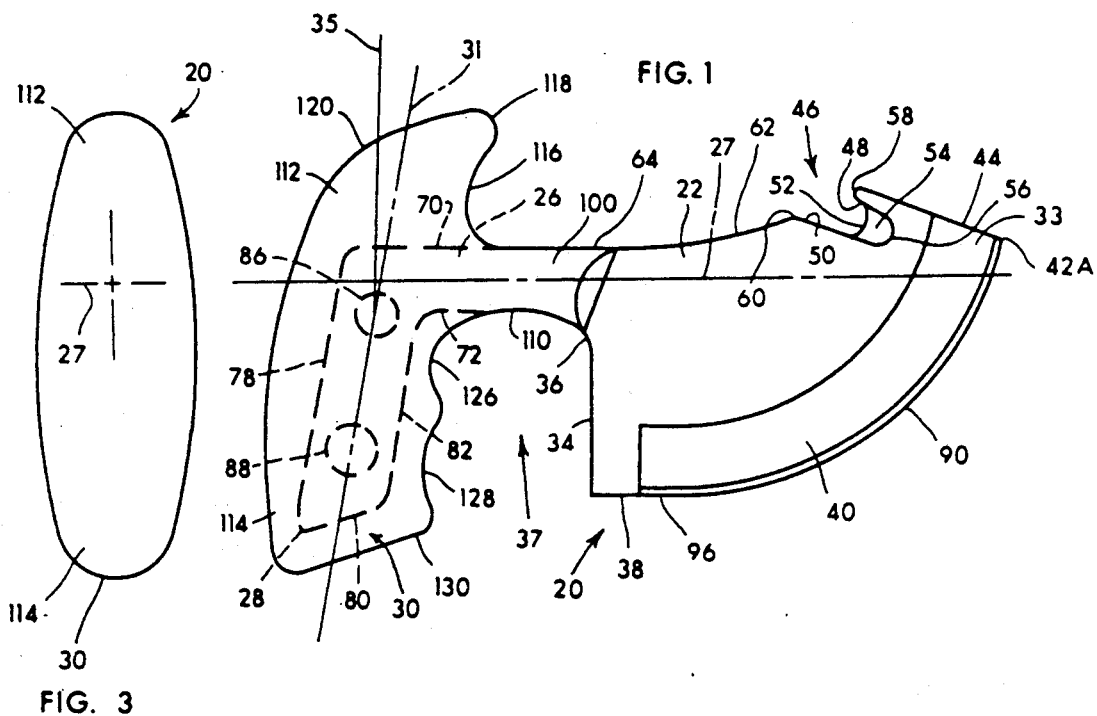
FIG. 1
FIG. 3
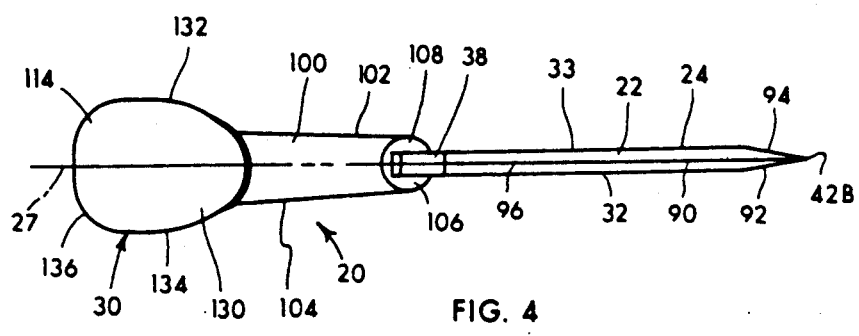
FIG. 4

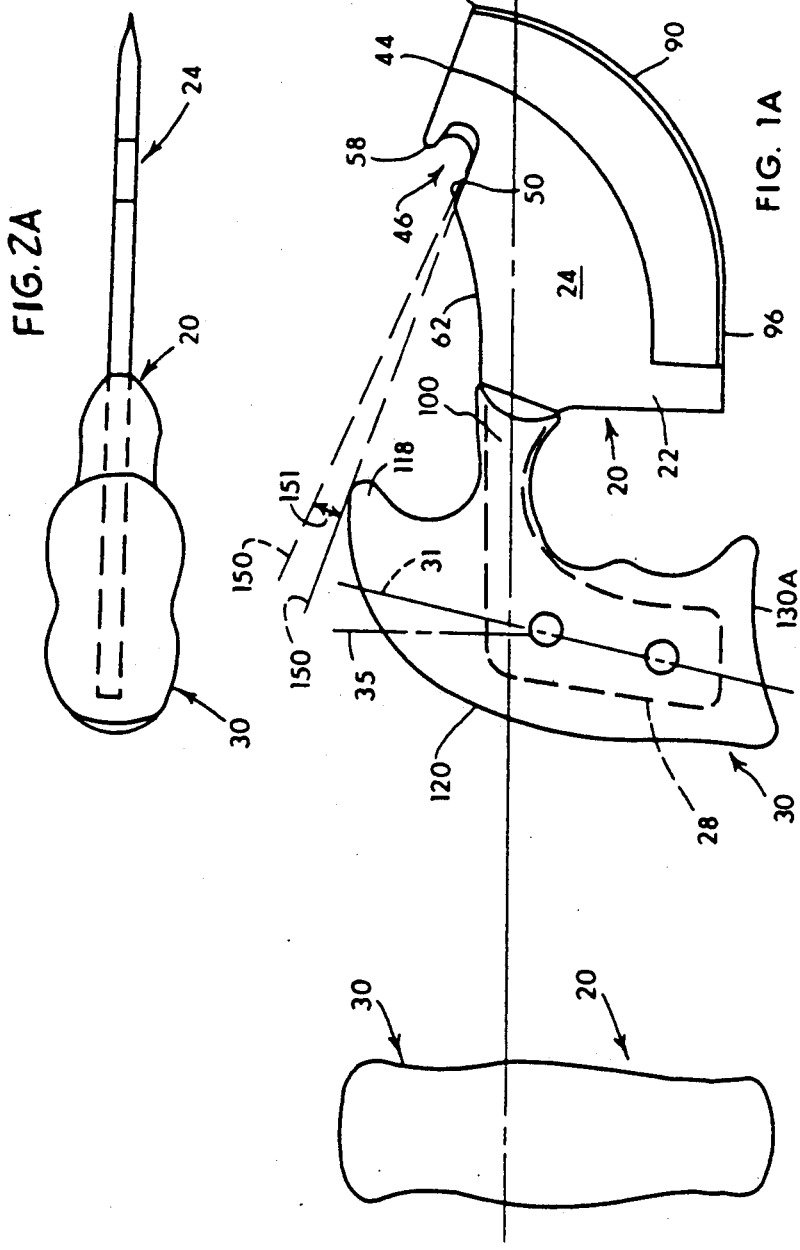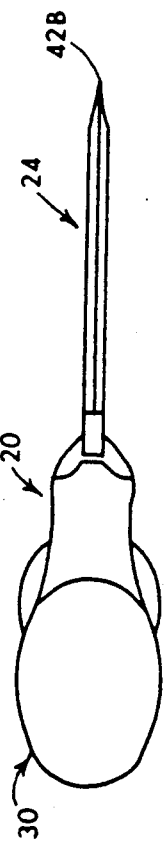

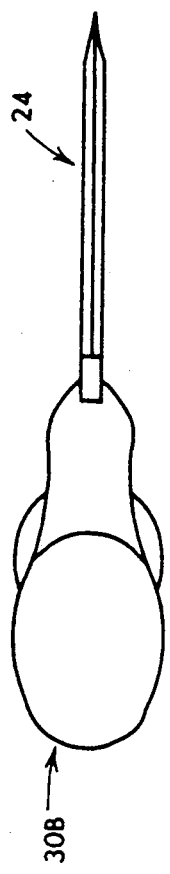
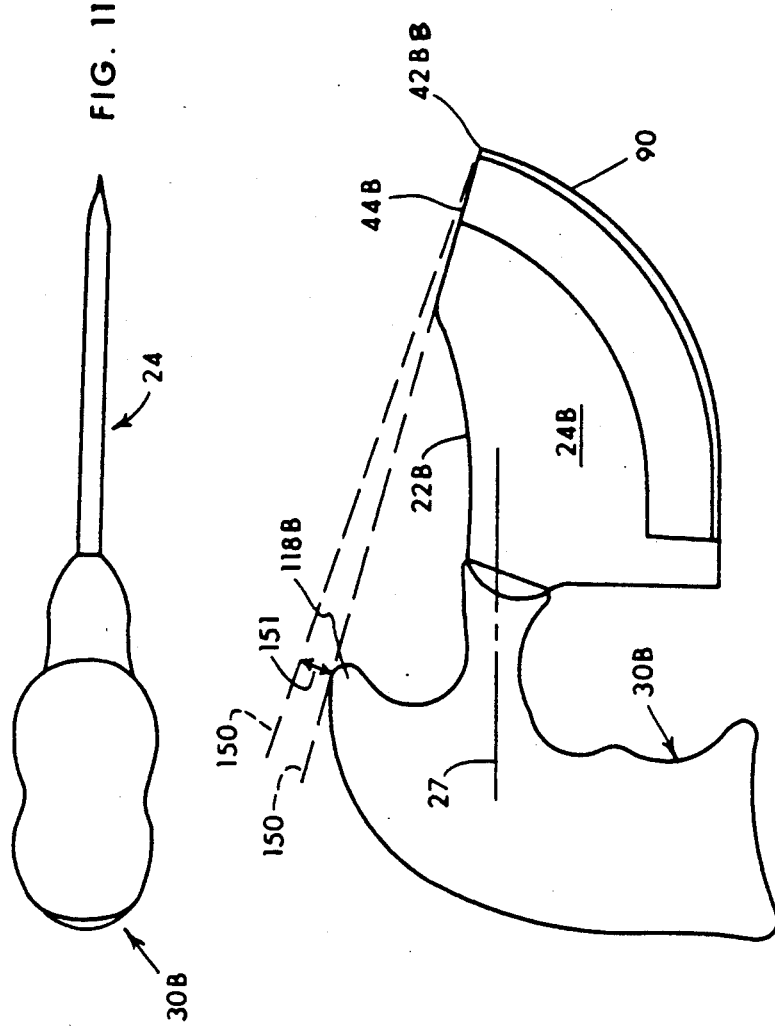
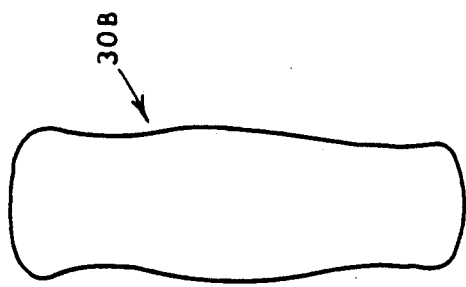

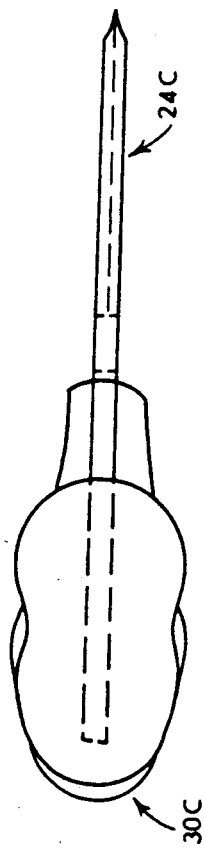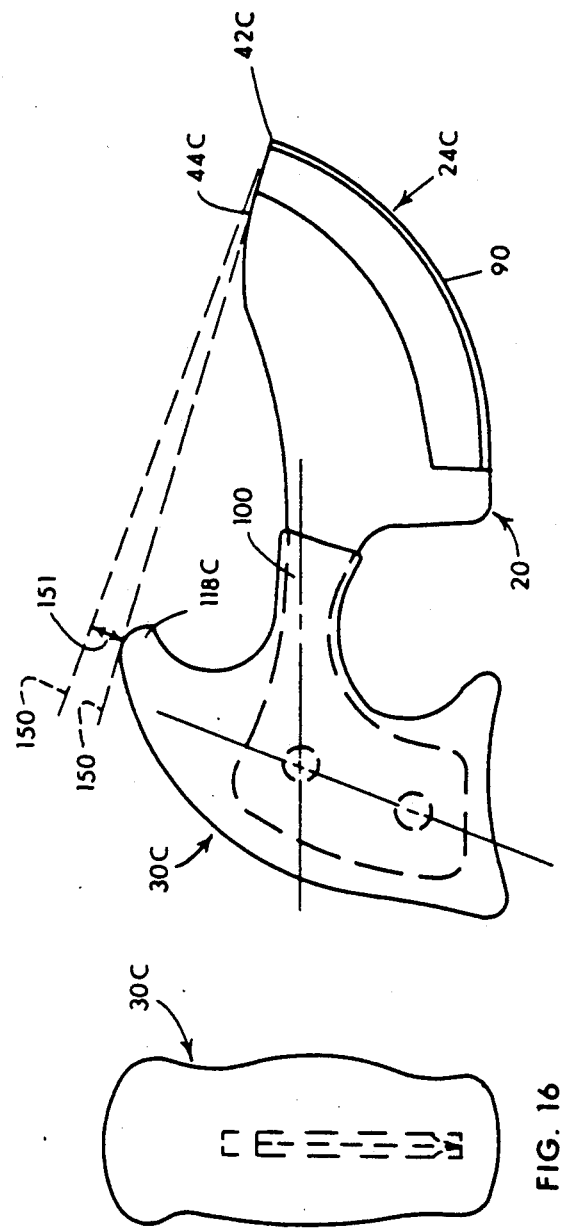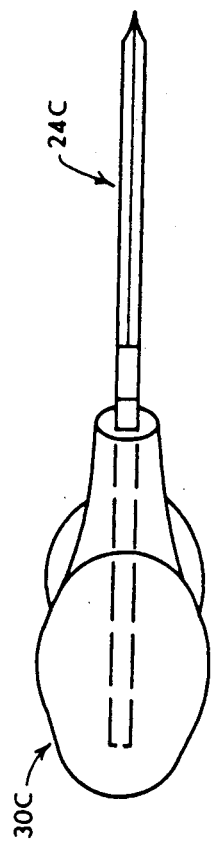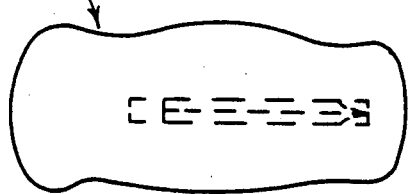

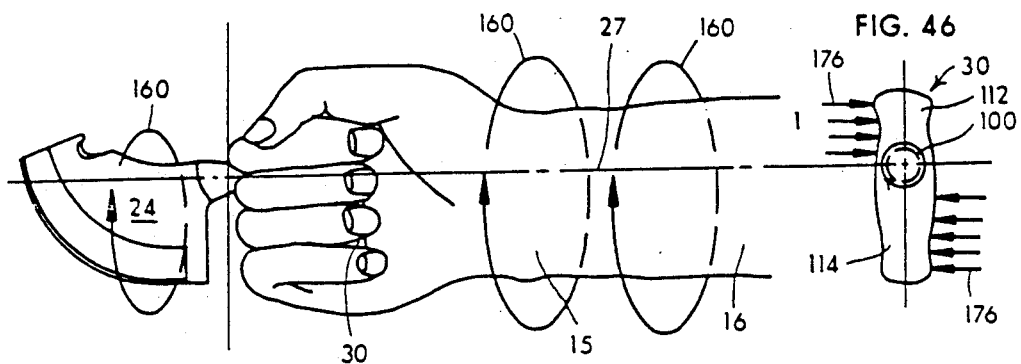
FIG. 45  FIG. 46
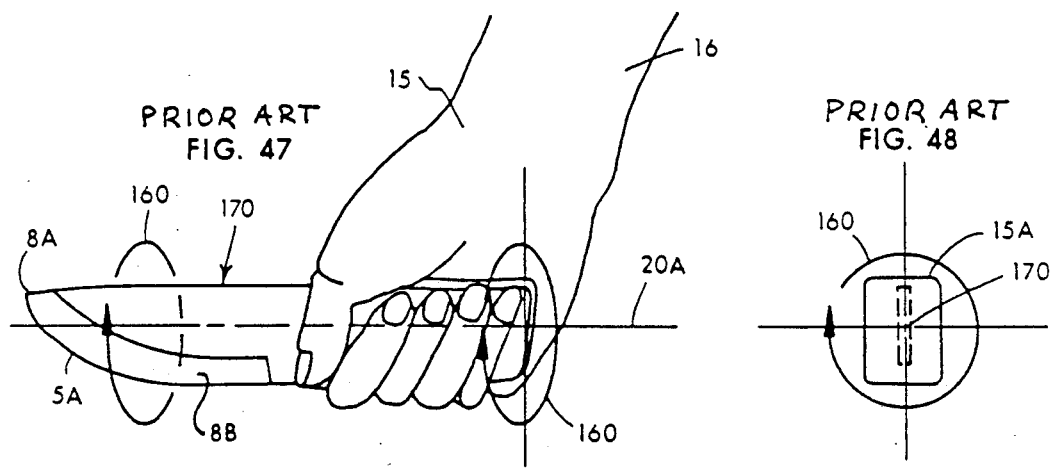
PRIOR ART FIG. 47  PRIOR ART FIG. 48
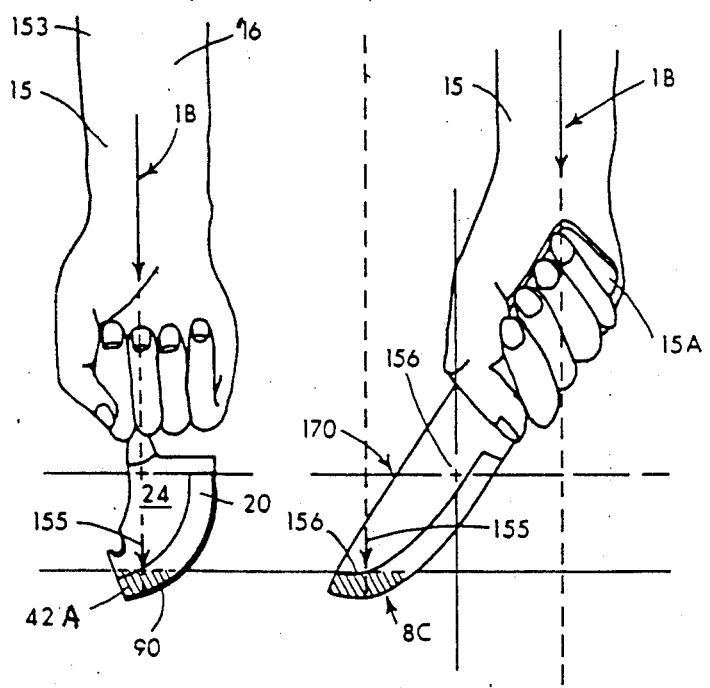
FIG. 49  FIG. 50 PRIOR ART

SKINNING AND CUTTING KNIFE

This application is a continuation application based on application Ser. No. 07/490,507, filed Mar. 1, 1990, which was a FWC application based on application Ser. No. 07/276,248, filed Nov. 25, 1988, both now abandoned.

FIELD OF INVENTION

This invention generally relates to knives for cutting and skinning animals; and, more particularly, to knives which are particularly constructed and arranged for use by hunters in the field for gutting, skinning and quartering of game animals or the like. Knives constructed in accordance with the present invention may also be used by meat cutters to cut domestic animal carcasses in meat processing plants or the like.

BACKGROUND OF THE INVENTION

Soon after a game animal is killed, field dressing is required to inhibit bacteria growth and prevent premature spoilage of meat. Field dressing refers to the process of preparing the carcass of a game animal at the location the animal was killed to minimize spoilage and preserve the meat for later consumption. Once all life functions have ceased, the body begins to decay. The unchecked bacterial growth of the internal organs (viscera) and body fluids spreads quickly through the carcass and will cause meat to be unfit for human consumption in a matter of hours. To prevent this, the process of gutting is performed. Gutting involves removing all viscera inside the abdomen and thorax. Removing viscera prevents bacterial growth of viscera from spreading to the meat, aids in cooling the meat and prevents unpleasant visceral body fluids from spreading to the meat. Heat and moisture further increase the spread of bacteria. Therefore, after gutting, the carcass must be cooled from the warm natural body temperature to a refrigerated temperature as soon as possible. Skinning involves removing the animal skin which further aids in cooling and drying by exposing meat to the atmosphere. After gutting and skinning, the carcass may be quartered. Quartering involves severing points of the skeletal system to divide the carcass into small sections. Quartering further aids in cooling by exposing a greater surface area of the meat to the atmosphere. In addition, quartering aids in transporting the carcass from the field.

The process of gutting, skinning and quartering requires a variety of cutting techniques as well as cutting operations at numerous angles and directions. Cutting operations vary from delicate, intricate cutting strokes while gutting and skinning, to forceful cutting required to quarter game. To efficiently gut, skin and quarter a game animal one or more cutting tools have in the past been required to perform both such intricate as well as forceful cuts. The present invention provides a knife structure to perform all these cutting operations with greater speed, dexterity, safety and less chance of meat spoilage than all previous knife designs.

In general, the present invention provides a knife which comprises a relatively short-length blade having a relatively large radius cutting edge portion which terminates at an intersection with a rearwardly inclined straight or slightly curved blunt flat edge surface. A skin-membrane cutting means is provided at the rearward end of the blunt flat edge surface by a rearward facing slot terminating in a curved cutting edge. The knife further comprises a handle having a longitudinal axis which is transverse to the longitudinal axis of the blade so that when the knife blade is held in a horizontal attitude with the forearm of the user in a horizontal attitude, the user's wrist is not bent relative to the forearm. The handle achieves this blade orientation by providing a generally oval-shaped shank portion with an axis coaxial to the longitudinal portion of the blade and transverse to the main handle section. This shank portion is where the exposed steel blade extends into and is enclosed by the handle material. The shank extends between the fingers when the main handle section is gripped and enclosed in the hand (FIGS. 26, 27, 28). The blade structure is specifically designed and located relative to the handle to provide maximum ease of cutting with maximum safety.

Presently available skinning and dressing knives have an elongated relatively narrow width blade with an elongated handle having a longitudinal axis which is coaxial with the longitudinal axis of the blade. Thus, when the knife is held in a horizontal attitude with the forearm of a person in a horizontal attitude, the wrist must be downwardly bent (FIG. 52) or upwardly bent (FIG. 35) to apply the sharp long edge of the blade to the carcass and cutting motion is limited and muscles are strained.

One feature of the present invention which improves its function over a conventional field knife is the provision for a greater angle of rotation of the knife. The knife is gripped in a manner providing greater dexterity to maneuver the blade and change cutting direction by rotating the knife.

A conventional skinning knife's range of effective cutting directions is approximately 180° of rotation around the axis of the wrist. This range is limited by rotation of the wrist and forearm. Rotation is limited since the wrist is bent for most cutting applications. Cutting while the wrist is bent allows rotational movement of the knife from the elbow to the hand which grips the knife. Cutting with a bent wrist limits ease of movement and dexterity with the knife since the muscles of the forearm are continuously extended and contracted in order to manipulate the knife and change cutting directions. For example, when skinning a deer carcass hung vertically from a tree, the only effective and comfortable cutting directions are those along 180° degrees of arc below the horizontal. This includes all cutting directions between horizontal cutting to the right, downward cutting, and horizontal cutting to the left. When cutting in directions 180° above the horizontal, the conventional knife is awkward, ineffective and can be unsafe. This is because the wrist and elbow are rotated to uncomfortable cutting positions and undue strain is applied to the forearm muscles.

The knife of the present invention can cut effectively and safely through all cutting directions around a 360° arc. This knife allows the user to change cutting direction by rotating the entire arm, from the hand gripping the knife to the shoulder. This gives the user a greater angle of rotation than when using a conventional skinning knife. Movement, dexterity, control of the cutting edge and safety are improved while the chance of cutting viscera is reduced because the wrist is always straight while cutting with the knife. Cutting with a straight wrist allows the muscles of the forearm to remain relaxed during all cutting applications. This eliminates muscle strain and fatigue which occurs during the course of gutting, skinning and quartering with a conventional knife. Eliminating muscle fatigue further increases blade control, reducing the chance of the user slipping and cutting oneself or cutting viscera, releasing unpleasant body fluids which taint the meat. Therefore, game can be dressed out faster with the knife of the present invention, with greater safety, and the possibility of meat spoilage reduced.

Another feature of the present invention provides a cutting hook oriented in a particular manner relative to the blade and handle. This cutting hook configuration greatly improves the ability of the present invention over presently available field knives to pierce and then cut a linear longitudinal slit through skin and membrane tissue of a game animal while eliminating the possibility of cutting viscera or the user cutting oneself when performing these cuts.

Upward cutting is another function which cannot be safely and effectively performed using a conventional knife. Upward cutting refers to inverting a conventional knife so the sharpened edge is perpendicular and adjacent to the V between the thumb and first finger as shown in FIG. 52. This grip is used to cut vertically upward by rotating the forearm upward using the elbow and shoulder as pivots. This is dangerous since the sharp edge of the blade arcs up towards the user's upper body and head.

The knife of the present invention can safely cut upward by inverting the knife so the sharp edge is in line with the thumb as shown in FIG. 53. Using the inverted grip, the knife can be held three ways: the handle-blade connection can rest between the index and middle finger; between the middle and third finger; and/or between the third finger and little finger. When cutting upward, the sharp edge always points away from the user to eliminate the possibility of the user being injured.

When cutting upward with the knife of the present invention, the wrist is always straight. This provides the user with a safer, more stable and powerful grip. Cutting with the wrist straight reduces the chance of slipping and injuring the user. When cutting upward with a conventional knife, the wrist is usually bent downward (FIG. 52), to reduce the chance of the users cutting themselves. This results in a less stable grip than that of the present knife.

Another advantage of the present knife is the ability to effectively and safely cut an object over one's head. With a conventional knife, the grip is unstable and ineffective when cutting overhead with the forearm extended vertically. Again this results from the bent wrist, and rotation of the wrist and forearm is limited. The present knife can effectively cut overhead since the wrist is straight and because the knife can easily be manipulated by rotating the wrist, forearm and shoulder.

Other objects and advantages are illustrated in the drawings and described hereinafter. For example, various features of the present invention may be employed with knives designed and constructed for other uses such as cutting of domestic animal meat in meat processing plants.

BRIEF DESCRIPTION OF DRAWINGS

Illustrative and presently preferred embodiments of the invention are shown in the accompanying drawings wherein:

FIGS. 1 & 1a are side elevational views of presently preferred embodiments of the knife of the present invention;

FIGS. 2 & 2a are top views of the knife of FIGS. 1 & 1a;

FIGS. 3 & 3a are end views of the handle portion of the knife of FIGS. 1 & 1a;

FIGS. 4 & 4a are bottom views of the knife of FIGS. 1 & 1a;

FIG. 5 is an end view of the knife of FIG. 1;

FIG. 10 is a side elevation view of another embodiment of the knife of the present invention which includes four finger grips and no cutting hook configuration;

FIG. 11 is a top view of the knife of FIG. 10;

FIG. 12 is an end view of the handle portion of the knife of FIG. 10;

FIG. 13 is a bottom view of the knife of FIG. 10;

FIG. 14 is a side elevation view of another embodiment of the knife of the present invention which includes three finger grips and no cutting hook configuration;

FIG. 15 is a top view of the knife of FIG. 14;

FIG. 16 is an end view of the handle portion of the knife of FIG. 14;

FIG. 17 is a bottom view of the knife of FIG. 14;

FIG. 45 is a side elevation view of the embodiment of the knife of the present invention in FIG. 1 showing the knife handle being twisted using the wrist and forearm muscles to transfer torque to the knife blade;

FIG. 46 is an end view of the knife handle in FIG. 45. Arrows transverse to the handle surface indicate linear forces applied from the hand to the handle. The circular arrow indicates torque around the handle shank center generated from linear force applied to the handle;

FIG. 47 is a side elevation view of a conventional field knife showing the knife handle being twisted using the wrist muscles to transfer torque to the knife blade;

FIG. 48 is an end view of the knife handle in FIG. 47. The circular arrow indicates torsion transferred directly from the hand to the handle;

FIG. 49 is a side elevation view of the embodiment of the knife of the present invention in FIG. 1 showing the knife being used to apply downward force directly to a joint during a quartering operation. Note the shaded portion of the blade indicates the portion of blade inserted into the joint;

FIG. 50 is a side elevation view of a conventional field knife showing the knife being used to apply downward cutting force indirectly to a joint during a quartering operation;

DETAILED DESCRIPTION

Figure 7:
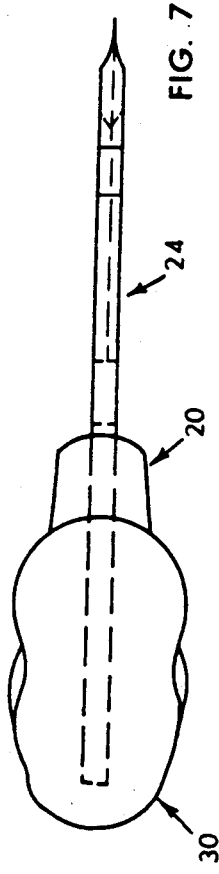
FIG. 7 is a top view of the knife of FIG. 6.

In general, as shown in FIGS. 1-9, the presently preferred embodiments of the knife 20 of the present invention comprises a one piece metallic member 22 (FIG. 1) having a relatively wide cutting blade portion 24, a relatively narrow shank portion 26 (FIGS. 1 and 2) with a longitudinal blade axis 27 and an elongated handle mounting portion 28 (FIGS. 1 and 2) connected to an elongated handle member 30 having a transverse longitudinal axis 31 (FIG. 1). Blade portion 24 has flat parallel side surface portions 32, 33 (FIGS. 2 and 4) and a hand-guard section in the form of a downwardly extending blunt rear surface portion 34 (FIG. 1) connected to the shank portion 26 (FIG. 1) by a curved surface 36 (FIG. 1) and forwardly spaced from the handle member 30 (FIGS. 1 and 4) by an elongated slot 37 (FIG. 1). A straight relatively short length blunt lower surface 38 (FIG. 1) separates the blunt rear surface portion 34 (FIG. 1) from an upwardly curved cutting edge portion 40 (FIG. 1) which terminates at a sharp knife tip 42B at an intersection 42A (FIG. 1) with an upwardly rearwardly inclined blunt straight edge surface 44 (FIG. 1) located above the longitudinal blade axis 27.

A skin-membrane slot or cutting hook 46 (FIG. 1) is defined beneath and generally parallel to the blunt straight edge surface 44 by side surfaces 48 and 50, an arcuate cutting edge portion 52 (at an intersection with the blade side surface portions 32 and 33), and a cutting side surface 54 which extends forwardly to a curved edge surface 56 at an intersection with the blade side surface 33. The side surface 48 is connected to the upper blunt straight edge surface 44 by a blunt tip in the form of a short-length, blunt, rounded connecting surface 58 which is located forwardly of an intersection 60 between the lower side surface 50 and an upwardly curved upper blade surface 62 connected to a straight blunt upper blade surface 64 which is enclosed in the handle member 30.

Referring to FIG. 1a, an upwardly inclined line 150 extends off the side surface 50, coaxial to the side surface 50 and intersects a tangent point on a top 118 of the handle member 30 or comes close to intersecting the top 118 of the handle member 30 within a small clearance 151.

The shank portion 26 (FIG. 2) has flat, parallel side surfaces 66, 68 which are coplanar with the side surface portions 32, 33 and has upper and lower flat surfaces 70, 72. The handle mounting portion 28 has flat, parallel side surfaces 74, 76 (FIG. 2) which are coplanar with the surfaces 32, 33 and 66, 68 and has flat, peripheral surfaces 78, 80, 82. Holes 86, 88 enable fixed attachment of the handle member 30 which is molded about the handle mounting portion 28.

The cutting edge portion 40 has a relatively large radius curved cutting edge 90 (FIG. 1) defined by inclined intersecting side surfaces 92, 94 (FIG. 2) which provide the sharp point intersection at 42A and a relatively short-length straight cutting edge portion 96 adjacent to the blunt surface 38.

The handle member 30 comprises a generally oval-shape shank portion 100 (FIGS. 1 and 4) having forwardly inwardly tapered side surfaces 102, 104 (FIG. 2) which terminate in beveled end portions 106, 108, and a curved bottom surface 110 (FIG. 1). The handle member 30 also comprises an uppermost handle portion 112 located above the longitudinal axis 27 and a lowermost handle portion 114 located below the longitudinal axis 27. The uppermost handle portion 112 has a curved finger grip portion 116, the top or curved upper end portion 118, a curved rear surface portion 120, and forwardly inwardly tapered side surfaces 122, 124. The lowermost handle portion 114 has curved finger grip portions 126, 128, for three fingers and a bottom surface portion 130 (shown as a curved portion 130A in FIG. 1a). The lowermost handle portion 114 also includes rounded tapered side surface portions 132, 134, and a rear side wall portion 136 shown in FIG. 4.

FIGS. 18–21 show an alternative embodiment wherein the handle member 30 extends at substantially a right angle to the longitudinal axis 27 and has flat parallel side surfaces 140, 142 connected by respective rounded front and rear surface portions 146, 144. The metallic member 22 has a handle attachment portion 148 which also extends at a right angle to the longitudinal axis 27, but is otherwise of the same general construction as the preferred embodiment of FIGS. 1–9.

FIGS. 6–9 show an alternative preferred embodiment of the knife 20 which comprises a three-finger grip 116A and a narrower handle member 30A and blade width than the embodiment illustrated in FIGS. 1–5.

FIGS. 10–13 show an alternative embodiment of the knife 20 which comprises a four-finger grip handle member 30B similar to the preferred embodiment in FIGS. 1–5. The metallic member 22B of this embodiment comprises a blade portion 24B similar to the preferred embodiment in FIGS. 1–5 with the exclusion of the skin-membrane slot 46. This embodiment comprises a blunt straight flat edge surface 44B. If the straight rearward upwardly inclined line 150, coaxial to the blunt edge surface 44B, is extended off the end of edge surface 44B, it should intersect a tangent point on the top 118B of the handle member 30B or come close to intersecting the top 118B of the handle member 30B within a small clearance 151.

FIGS. 14–17 show an alternative embodiment which comprises a three-finger grip handle member 30C similar to the preferred embodiment in FIGS. 6–9. The blade portion 24 of this embodiment is similar to the preferred embodiment in FIGS. 6–9 with the exclusion of the skin-membrane slot 46. This embodiment comprises a blunt flat edge surface 44C. If a straight rearward upwardly inclined line 150, coaxial to the edge surface 44C, is extended off the end of edge portion 44C, it should intersect a tangent point on the top 118C the handle member 30C or come close to intersecting the handle member 30C within a small clearance 151.

In the embodiments of FIGS. 1–21, the knife 20 is constructed and arranged in accordance with the following design parameters:

CRITICAL DIMENSIONS—FIGS. 1, 6, 10, 14

1a. Blade width=1.0–2.0 in.

Figure 6:
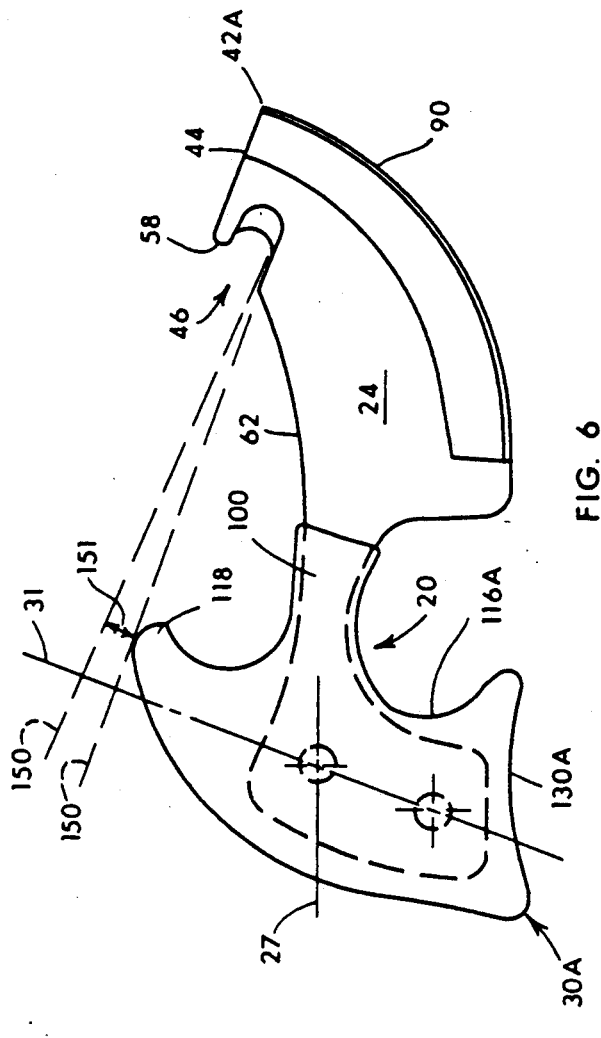
FIG. 6 is a side elevation view of a presently preferred embodiment of the knife of the present invention which includes three finger grips and a cutting hook configuration.
Figure 9:
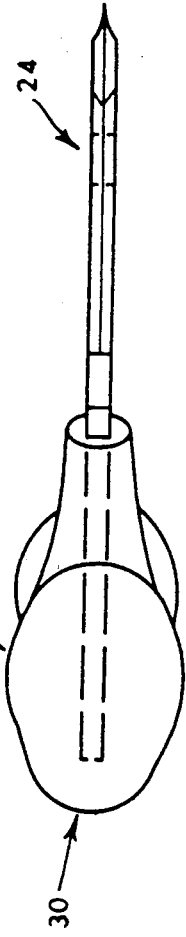
FIG. 9 is a bottom view of the knife of FIG. 6.
Figure 8:
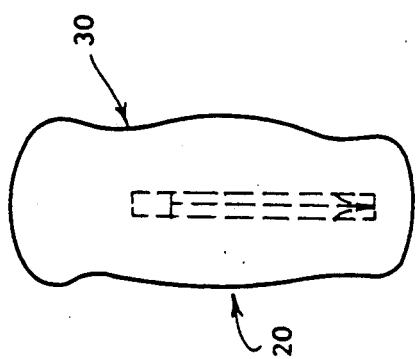
FIG. 8 is an end view of the handle portion of the knife of FIG. 6.
Figure 19:
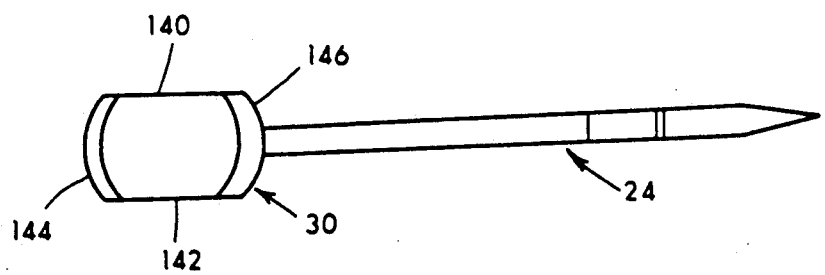
FIG. 19 is a top view of the knife of FIG. 18.
Figures 18, 20:
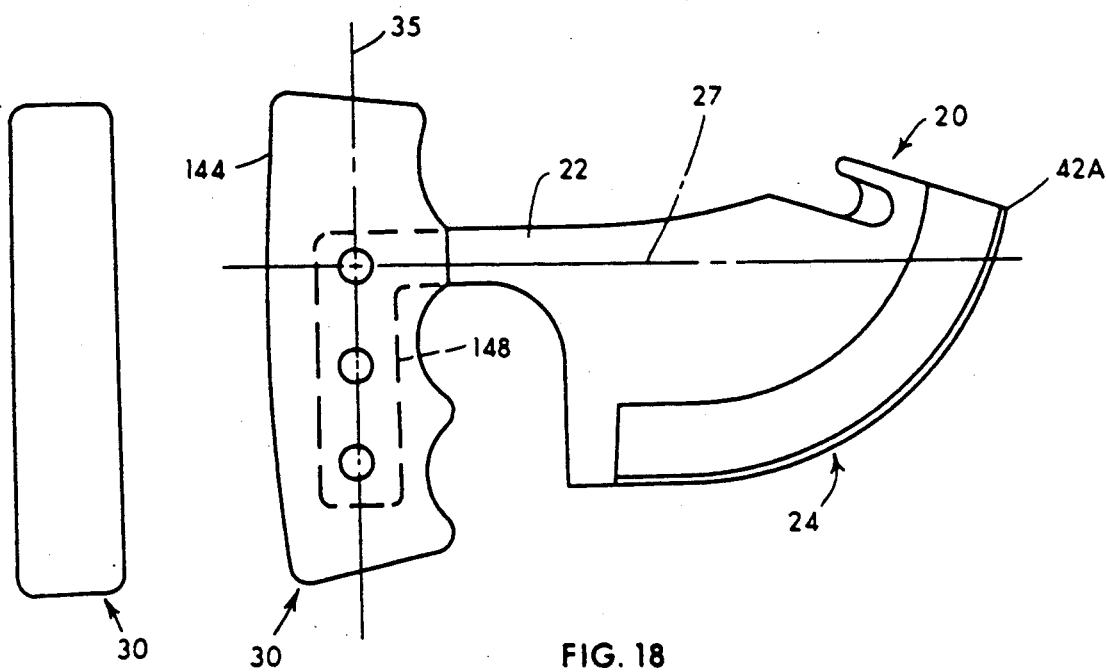
FIG. 18 is a side elevation view of another embodiment of the knife of the present invention which includes three finger grips and a cutting hook configuration.
FIG. 20 is an end view of the handle portion of the knife of FIG. 18.
Figure 21:
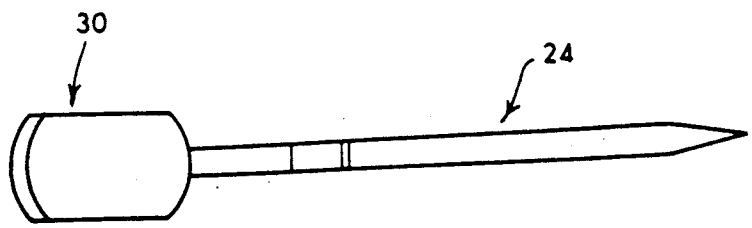
FIG. 21 is a bottom view of the knife of FIG. 18.
Figure 22:
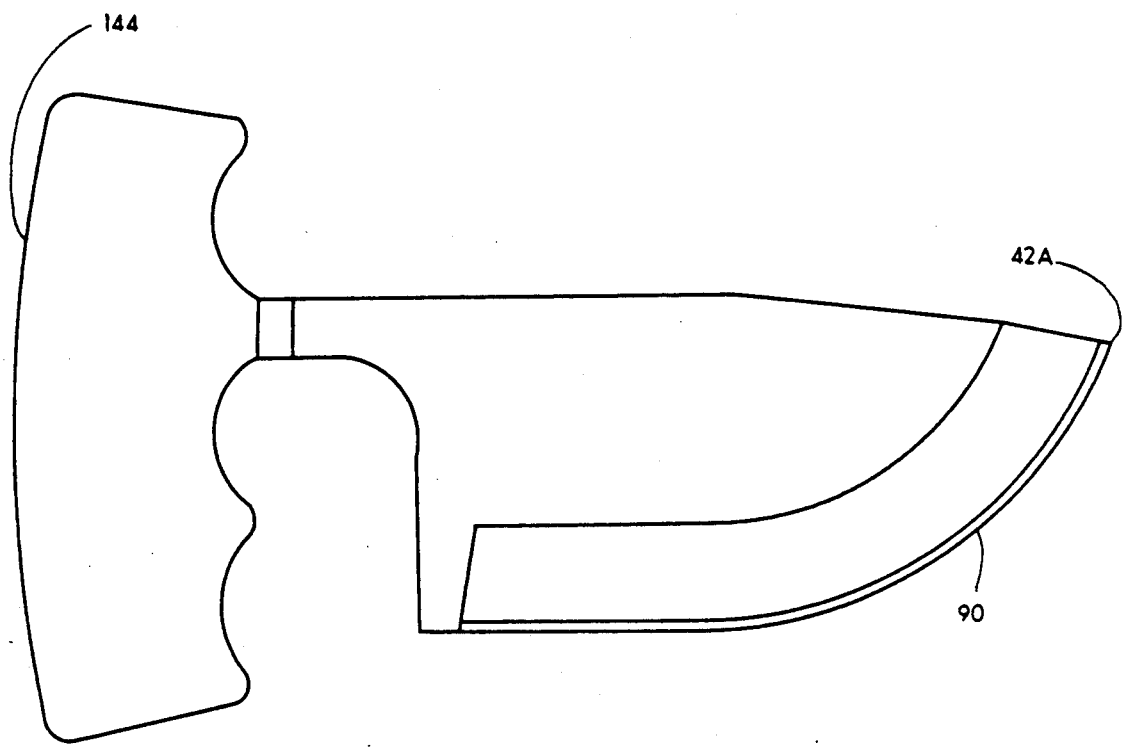
FIG. 22 is a side elevation view of another embodiment of the knife of the present invention which includes three finger grips and no cutting hook configuration.

For the three finger grip handle embodiments in FIGS. 6 and 14 blade width of 1.0–1.5" is beneficial since a narrower blade width weighs less and therefore is more maneuverable than a wider blade. For the four finger grip handle embodiments in FIGS. 1 and 10, a wider blade of 1.5 to 2.0" is beneficial since blade mass is greater for applying a large impact force. In addition, a wider blade is capable of applying a greater amount of torsion.

1b. Clearance less than or=0.30 in. See FIG. 1a.

Both the three and four finger grip handle embodiments require a blade width so the blunt lower surface 38 of the cutting edge portion 96 is within 0.30 in. in a linear direction downward to an intersection with horizontal axis contacting the bottom surface portion 130 of the handle member 30. This allows the rearward straight cutting edge portion 96 of the knife 20 to cut while the handle bottom surface portion 130 contacts the surface being cut.

2. Blade length=2.0–4.0 in.

A short curved blade is beneficial for delicate, intricate cutting when skinning and gutting while a longer blade is beneficial for cutting meat and applying large cutting forces to quarter. As blade length increases, control of the cutting edge is reduced. A blade length of 4.0 is the maximum length for a field knife which will enable delicate intricate cutting without loss of control.

3. Straight cutting edge portion 96=0–3.0 in.

The straight cutting edge portion 96 of the blade cuts through flesh by pulling or pushing the knife 20 in a linear motion.

4. Curved cutting edge 90=2.0–4.0 in.

The curved cutting edge 90 cuts with a rolling wrist motion, improving the knife's ability to contact and sever the tissue connecting the skin to the body while skinning.

5. Curved edge radius=2.5–5.0 in.

A small radius is used near the tip of a straight edge field knife and a large radius is used for the curved cutting edge 90 so the curved cutting edge 90 may remain curved for a major portion of the cutting space.

6.* Finger space=0.70–1.0 in.

This is the required distance between the centers of the finger grip portions 126 and 128 in FIGS. 1 and 10 to provide spacing between two adjacent fingers for a comfortable grip.

7.* Handle-blade clearance=1.1–1.3 in.

Required distance between center of the finger grip portions 126, 128 and the rear surface portion 34. This dimension provides a clearance which prevents the outside of the fingers contacting finger grip portions 126 and 128 from contacting the rear surface portion 34. All forces are transferred directly from the handle member 30 to the blade portion 24 through the handle shank portion 100 without having the hand contact any portion of the blade portion 24. This dimension provides clearance for a gloved hand as well.

8.* Finger groove width=0.9–1.4 in.

Handle width dimension from the curved rear surface portion 120 of the handle member 30 to the center of finger grip portions (116, 126, 128).

*Note: All handle dimensions are scaled up or down in proportion to hand size. This is so the knife 20 maintains its function and comfortably fits a variety of hand sizes. Different size handles will be available.

9.* Finger notch width=1.1–1.6 in.

Handle width dimension from the curved rear surface portion 120 of the handle member 30 to outside the finger grip portion 116.

10.* Handle width=0.80–1.1 in. (FIG. 3)

Handle width varies over the length of the handle member 30 to form grooves and contours which improve grip.

11.* Handle length=2.3–3.6 in.

Handle member 30 length Varies to include all embodiments in FIGS. 1–18. A longer handle member 30 in FIGS. 1, 10 and 18 embodiments is beneficial when transferring torque and forward cutting force to the blade portion 24 since the hand contacts a larger section of the handle member 30, transferring greater hand and arm force to the knife blade portion 24. A smaller handle member 30 in FIGS. 6 and 14 embodiments is less bulky and therefore is beneficial for delicate, intricate cutting.

12.* Minimum Blade width=0.150 in. (see stress analysis)

13. Minimum blade shank width 0.35 in. (see stress analysis)

14. Handle shank width=0.35–0.50 in

This is the minimum width of the handle shank portion 100 so the blade shank portion 26 thickness can be fully enclosed in the handle material and the maximum width so the handle shank portion 100 extends comfortably through the fingers.

15. Handle clearance 151 when using the cutting hook 46 should be less than 0.30 in.

Figure 34:
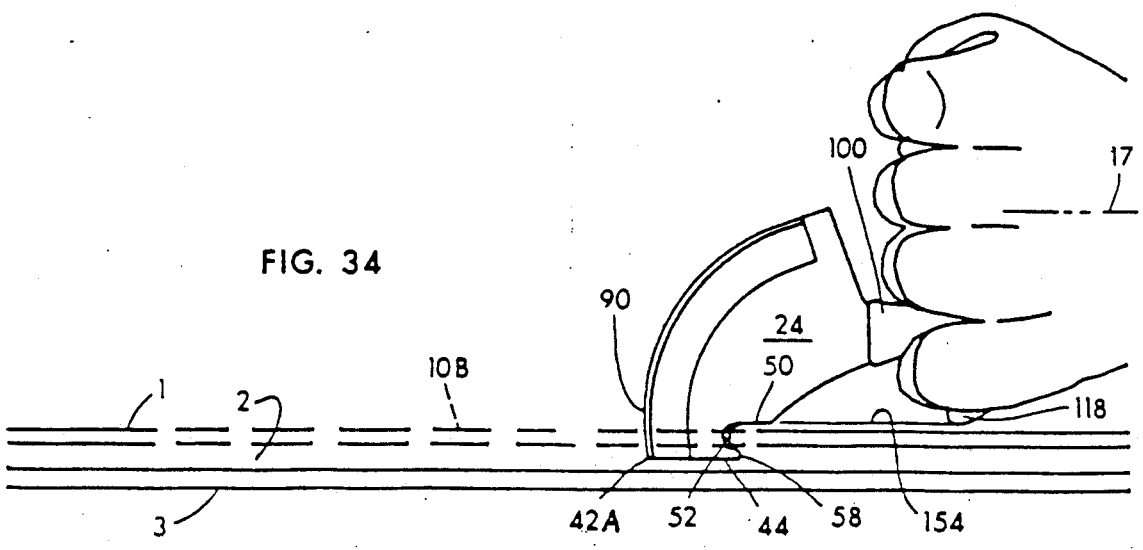
FIG. 34 is a side elevation view of the embodiment of the knife of the present invention shown in FIG. 1 showing the arcuate cutting edge being used to sever the skin membrane by pulling back towards the user.

This is the maximum distance between the intersection of the upwardly inclined line 150 and the top 118 of the handle member 30 in FIGS. 1a and 6. This dimension provides a clearance between the top 118 of the handle member 30 and the surface being severed to maintain the proper orientation of the cutting hook 46 when using the cutting hook 46 to sever membrane tissue 3 (FIG. 34).

16. Handle clearance 151 when forward membrane cutting=0–0.30 in.

Figure 31:
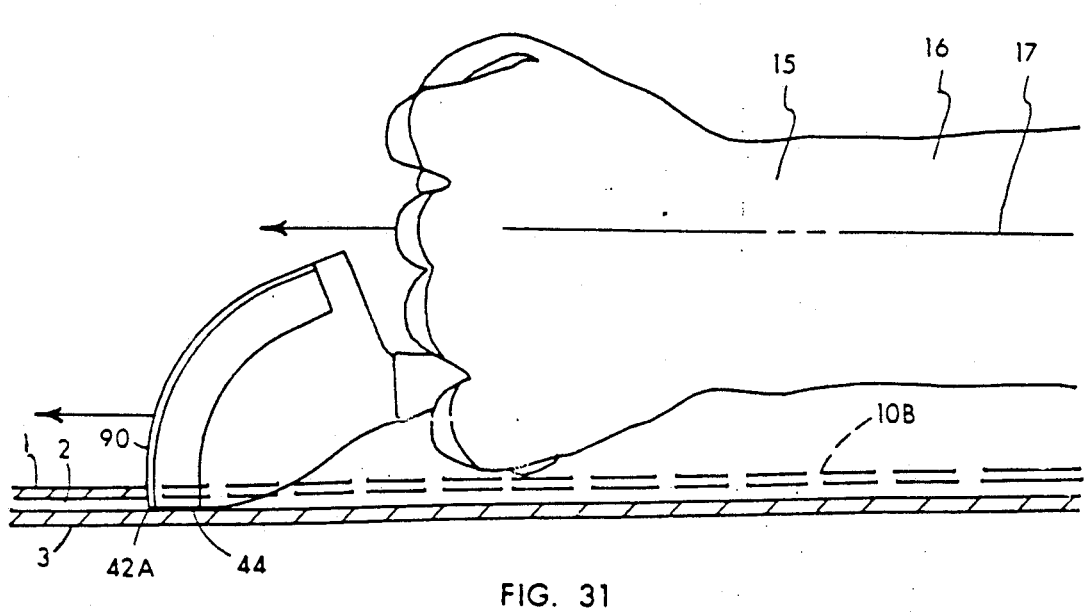
FIG. 31 is a side elevation view of the embodiment of the knife of the present invention in FIG. 10 being used to sever a skin membrane by cutting forward with the forward cutting edge portion.

This is the maximum distance between the intersection of the upwardly inclined line 150 and the tops 118B and 118C of the handle member 30 in respective FIGS. 10 and 14. This dimension provides a clearance between the top 118B of the handle member 30B and the surface being severed to maintain the proper orientation of the blunt straight edge surface 44 parallel to the surface being cut when forward cutting is performed to sever membrane tissue 3 (FIG. 31).

17.* Top finger grip height=0.85–1.10 in.

This is the required upward distance from the top of the handle shank portion 100 to the top 118 of the handle member 30 so that any finger contacting the finger grip portions 116 does not extend over the top 118 of the handle member 30. This dimension prevents fingers extending over the top 118 of the handle member 30 from affecting the proper orientation of the cutting hook 46 of the FIGS. 1 and 6 embodiments and of the blunt straight edge surface 44 when forward membrane cutting with the embodiments illustrated in FIGS. 10 and 14.

18. Angle of handle axis 31 transverse to the blade axis 27=8°–12°.

This is the angle between the transverse longitudinal axis 31 of the main handle member 30 and the axis 35 perpendicular to the longitudinal blade axis 27. When the handle member 30 is enclosed in the hand and a straight wrist is maintained, the front of the fist forms a 10° angle plus or minus 2° with the axis 35 transverse to the forearm 16 and the longitudinal blade axis 27. By setting the transverse longitudinal axis 31 at this angle, the blade portion 24 maintains the axis 27 coaxial to the axis of the forearm 16 when the wrist 15 is in a straight relaxed position.

OPERATION AND USE

Figure 25:
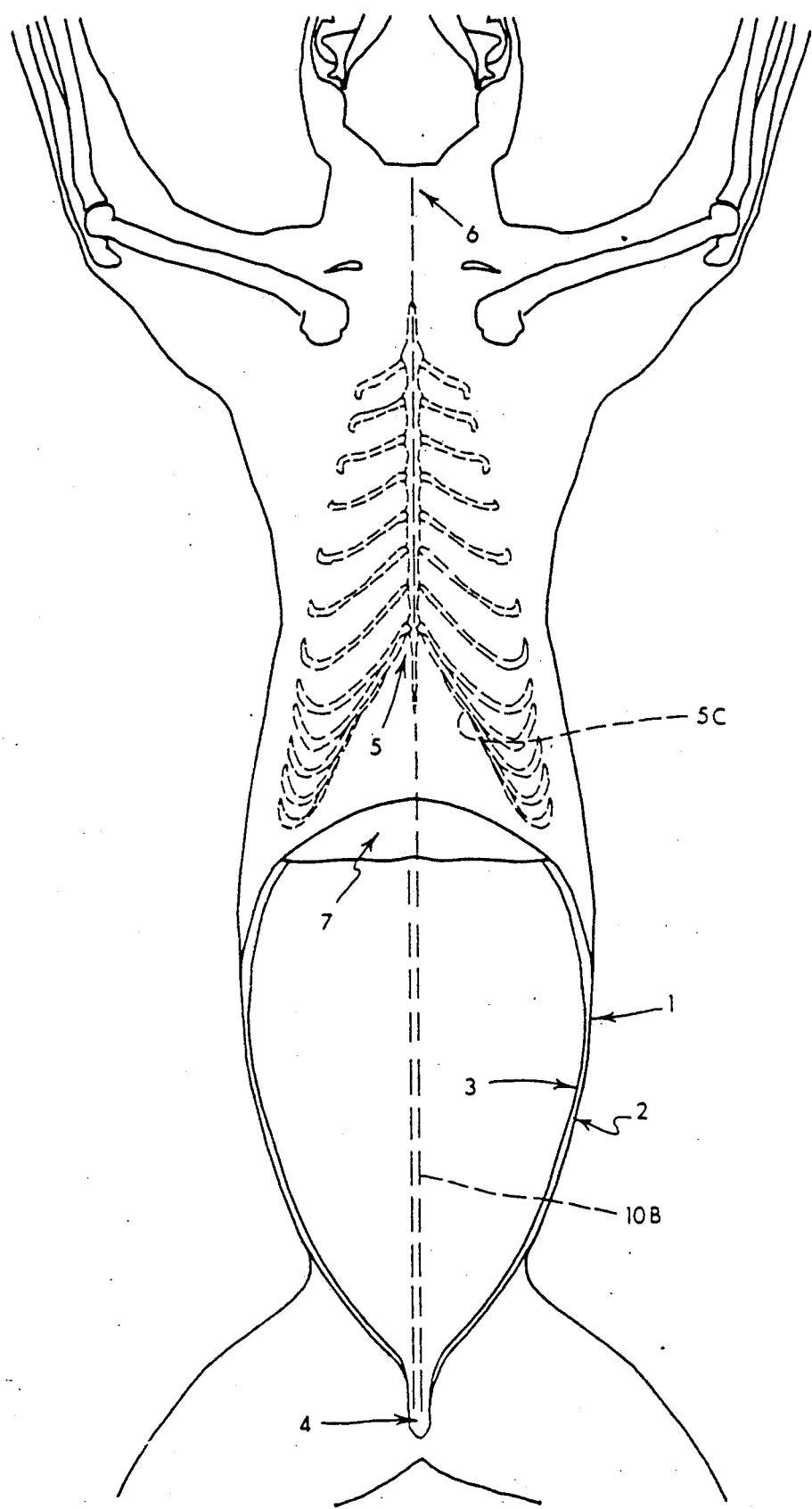
FIG. 25 is a bottom view of a cross section of an animal illustrating cuts through the belly skin membrane and the abdominal wall membrane by dashed lines.
Figure 29:
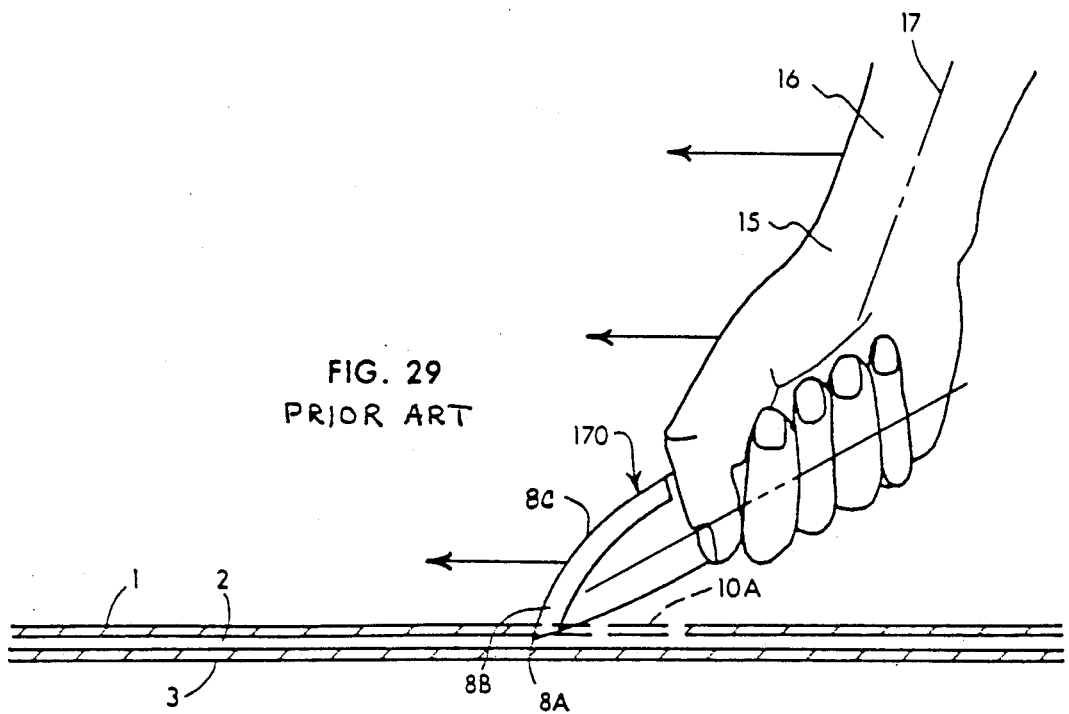
FIG. 29 is a side elevation view showing a conventional field knife being used to pierce the skin membrane and initiate a slit through the membrane by cutting forward with the tip and forward edge portion.
Figure 32:
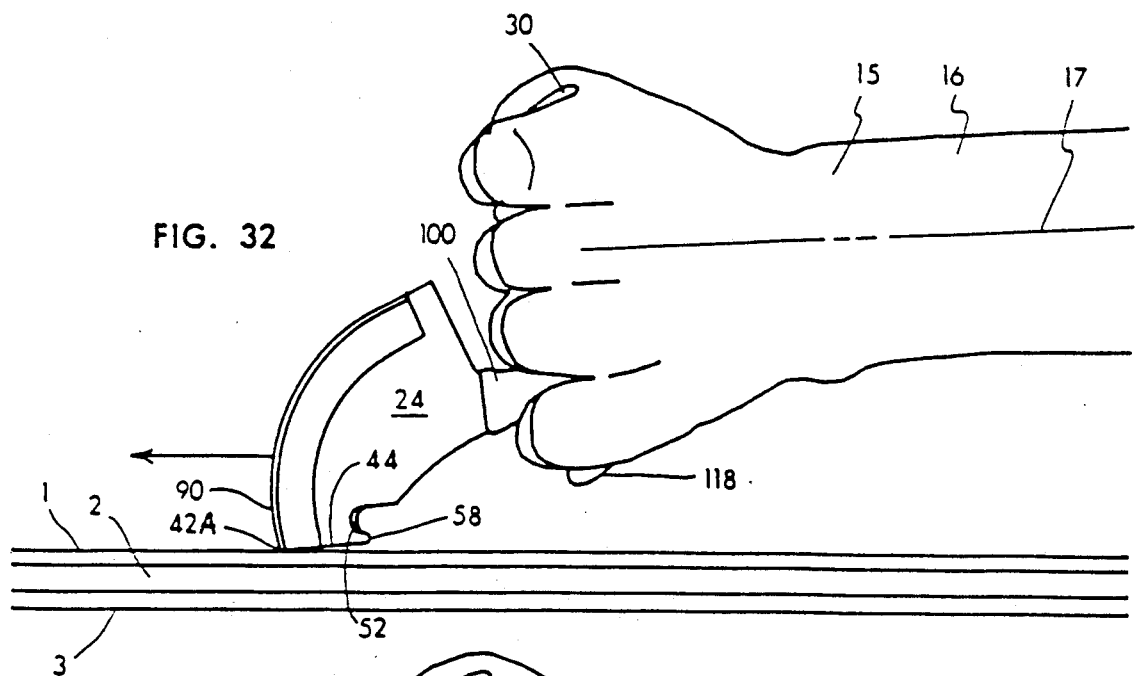
FIG. 32 is a side elevation view of the embodiment of the knife of the present invention in FIG. 1 showing the knife being used to pierce the belly skin membrane and initiate a longitudinal slit by cutting forward with the knife tip and forward cutting edge portion.
Figure 33:
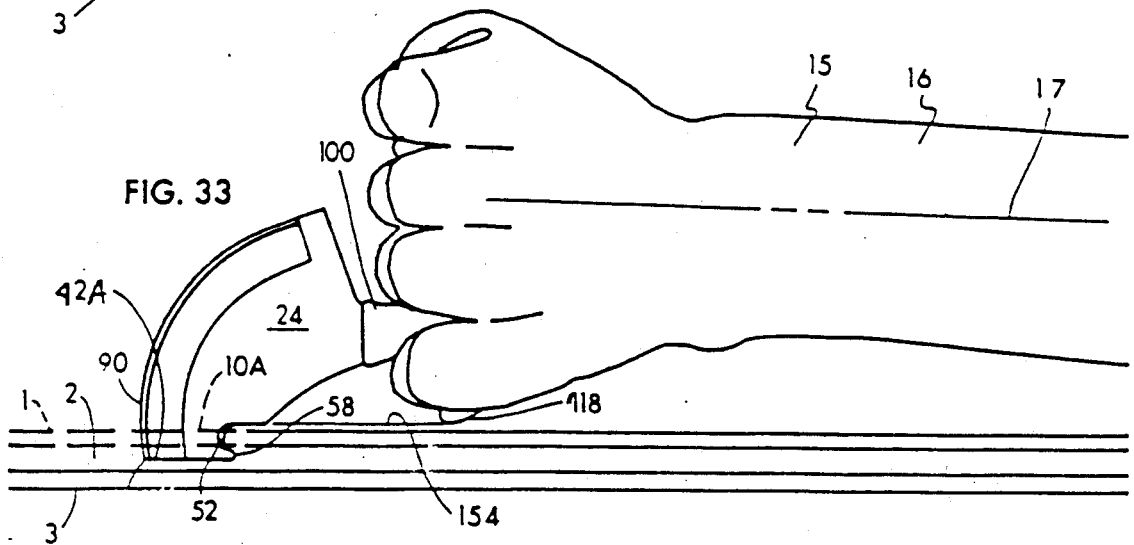
FIG. 33 is a side elevation view of the embodiment of the knife of the present invention in FIG. 1 after the portion of blade from the knife tip to the blunt tip drops below the skin membrane surface. At this point forward cutting terminates. The dashed line indicates the portion of the membrane severed by the cut initiated in FIG. 32.

Referring to FIGS. 23–25 and FIGS. 29–34, the process of skinning is initiated by cutting a linear longitudinal hole 10A (FIG. 29) through the belly skin 1 (FIGS. 29 and 33). The hole 10A through the belly skin 1 is initiated in the area near the reproductive organ 4 (FIG. 25) and continues as a slit 10B through the belly skin 1 upward in a linear longitudinal direction to where the slit 10B through the belly skin 1 may terminate at the bottom of the sternum 5. If a rib cage 5C is split to access and remove the viscera 5B inside the thorax 10 or the belly skin 1 is removed in the field, this slit through the belly skin 1 will continue linearly upward terminating at the neck 6 (FIG. 25). In a warm climate, splitting the rib cage 5C and removing the belly skin 1 in the field aids in cooling and drying the meat. A partition consisting of a thin muscular membrane or fatty layer 2 separates the skin 1 from the abdominal wall membrane tissue 3. The initial cutting through the belly skin 1 does not penetrate the abdominal wall membrane tissue 3 (FIGS. 31–34). Working on both sides of the center slit 10B through the belly skin 1, the cut skin 1 is peeled and/or cut back to expose the abdominal wall membrane tissue 3. To access the viscera 5B inside the abdominal cavity 11 (FIG. 23) and initiate the process of gutting requires severing the abdominal wall membrane tissue 3. The abdominal wall membrane tissue 3 is severed by extending the linear longitudinal slit 10B through the belly skin 1 relatively coaxial to the initial cut 10A through the belly skin 1. The cut 10A is initiated in the area near the reproductive organ 4 and terminates at the diaphragm 7 (FIG. 25). This cut is similar to cutting the belly skin 1. However, since the blade portion 24 enters the abdominal cavity 11, extreme care is required to prevent cutting the viscera 5B.

Figure 30:
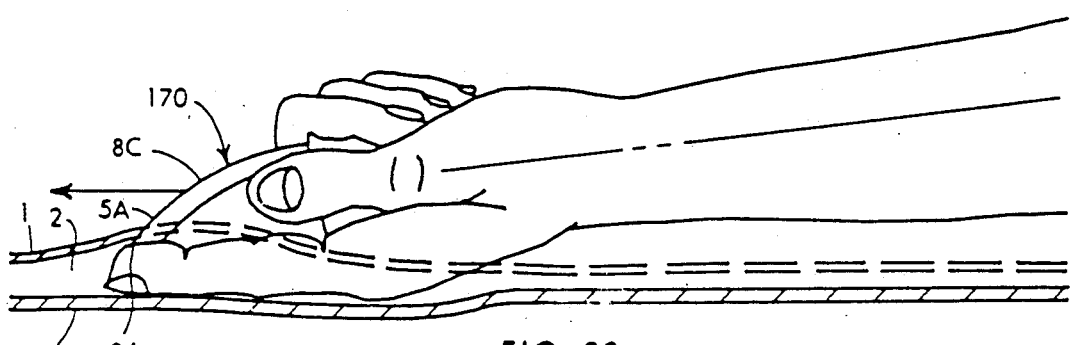
FIG. 30 is a side elevation view showing a relatively small conventional field knife severing a skin membrane by inserting the blade under the membrane and cutting forward with the forward edge portion while covering the sharp knife tip with a finger to prevent the tip from piercing the abdominal wall membrane and piercing viscera.

Cutting the belly skin 1 and the abdominal wall membrane tissue 3 requires two separate cutting operations which include both piercing and then slicing the membrane tissue 3. As shown in FIG. 29, using a conventional knife 170, first a hole 10A is pierced through the skin 1 with a knife tip 8A (FIG. 29). Second, a blade 8B is inserted in the hole 10A and under the skin 1. With a cutting edge 8C pointed upward toward the surface, the skin 1 is cut from the inside out (FIG. 30). The ability to sever the skin 1 from below the skin surface is improved over cutting from above the skin surface since the fleshy fatty layer 2 below the skin 1 is easily severed. Cutting from above the skin surface involves severing both hair and the dry outer skin layer. In addition, cutting from above the skin surface down towards the body cavity 11 increases the chance of cutting the viscera 5B.

When slicing the belly skin 1 and the abdominal wall membrane tissue 3 with the conventional knife 170, the exposed sharp knife tip 8A can accidentally pierce the abdominal wall membrane tissue 3 and cut the viscera 5B (FIG. 29). Therefore, once the knife tip 8A is used to pierce the membrane tissue 3, the grip and blade orientation change so the knife tip 8A is covered (FIG. 30). Many hunters prefer a small conventional knife 170 with a 1.5"–2.5" long blade to perform gutting and skinning. A small knife is beneficial since it is easier to control blade position and fingers can easily cover the sharp knife tip 8A (FIG. 30). Covering the knife tip 8A eliminates the chance of piercing the viscera 5B. However, the grip is unsafe since the fingers are in contact with the blade 8B and the knife tip 8A. When field dressing, the blade 8B becomes wet and slippery with blood and body fluids. Therefore, fingers contacting a wet blade 8B do not provide a secure grip, increasing the possibility of the user slipping and cutting oneself and the viscera 5B.

Referring to FIGS. 1a, 33 and 34, for example, the straight line 150 is extended off the termination of the lower side surface 50 parallel and coaxial to this side surface 50. The extended line 150 should intersect or come close to intersecting, within a relatively small clearance 151, a tangent point on the top 118 of the handle member 30. The clearance 151 may be provided between the extended line 150 and the top 118 of the handle member 30 so that when cutting is performed with the curved cutting edge portion 52, as shown in FIG. 34, neither the hand nor the top 118 of the handle member 30 interferes with the proper orientation and function of the entire cutting hook 46 when cutting the membrane tissue 3. When performing these cuts with the knife 20 of the present invention, the knife 20 can be held with either the upward (FIG. 26) or the inverted grip (FIG. 32) depending on which grip enables an improved cutting position. For both the three and four finger grip embodiments (FIGS. 1 and 6), most often the grip illustrated in FIG. 32 will provide the optimum grip. In FIG. 32, the knife 20 is inverted with the handle shank portion 100 extending between the pinky and the second fingers with the main handle member 30 completely enclosed in the hand. It is also possible to grip with the handle shank portion 100 between the second and middle fingers or the middle and index fingers. However, when using these grips, any finger extending over the top 118 of the handle member 30 must be tucked behind the handle member 30 so that it does not protrude above the line 150 in FIGS. 1a and 6. Each grip enables a straight wrist 15 and forearm 16 position (FIGS. 31-33) when using the cutting hook 46 configuration to pierce and sever the skin 1 and/or the membrane tissue 3. Referring to FIGS. 33 and 34, a line 154 indicates the surface of the skin 1 being cut by the arcuate cutting edge portion 52. Therefore, if the fingers protrude below the line 154 in FIGS. 33 and 34, they will interfere with the proper orientation of the cutting hook 46.

With the knife 20 of the present invention, cutting of the belly skin 1 and the abdominal wall membrane tissue 3 are both initiated by contacting the knife tip 42B to the point where the knife tip 42B initially pierces the skin 1 (FIG. 32). Cutting linearly forward, the sharp knife tip 42B pierces the skin 1 as the forward cutting edge 90 severs the skin 1 to form the slit 10B through the belly skin 1. The direction of the forward linear motion is parallel to the rearwardly inclined straight flat blunt edge surface 44. Forward cutting continues until the length of the slit 10B through the belly skin 1 is greater than the length of the blunt edge surface 44 from the knife tip 42B to the blunt surface 58. At this point forward cutting terminates and the blade portion 24 including the blunt edge surface 44, the knife tip 42B and the blunt surface 58 drop through the slit 10B and below the skin 1 (FIG. 33). Then, pulling back in a linear direction 180° opposite to the initial forward cut, the sharp edge portion 52 of the cutting hook 46 severs the skin 1 (FIG. 34).

The cutting hook 46 of the knife 20 of the present invention greatly improves the ability over presently available field knives when cutting the belly skin 1 and the abdominal wall membrane tissue 3 for numerous reasons. The knife 20 of the present invention enables use of the straight wrist 15 and forearm 16 cutting position, improving the ability to cut and control the curved cutting edge 90 when performing these cuts. Once the skin 1 is pierced with the knife tip 42B (FIG. 32), forward cutting continues in a direction relatively parallel to the relatively straight flat blunt edge surface 44. Since the flat blunt edge surface 44 contacts the top surface of the membrane tissue 3 under the skin 1 being severed when cutting forward, the blunt edge surface 44 serves to guide the cutting direction (FIG. 33). Combining the increased control of a straight wrist 15 position, with the ability of the blunt edge surface 44 to glide parallel to the membrane tissue 3 surface, guiding forward cutting, prevents the knife tip 42B from cutting in a direction towards the abdominal cavity 11. This eliminates the chance of cutting the viscera 5B when piercing the hole 10A and cutting forward through the skin 1 and/or the abdominal wall membrane tissue 3. Once the relatively straight blunt edge surface 44 drops below the surface of the belly skin (FIG. 33), forward cutting is terminated. Cutting direction then changes to a direction 180° opposite to initial forward cutting (FIG. 34) allowing the cutting hook 46 to sever the skin 1. As a result, only the cutting direction changes to pierce and cut the longitudinal slit 10B through the skin 1, while the grip and the blade portion 24 position remain the same. As the cutting direction changes the wrist 15 and the forearm 16 maintain a straight relative position, parallel to the surface being cut, improving control when pulling back. As the cutting hook 46 severs the skin 1, the portion of the blade portion 24 below the skin 1 surface (including the blunt curved tip 58, the sharp blade tip 42A and the straight blunt edge surface 44) glides in a direction parallel to the skin 1 being severed and the tissue below the skin 1 (FIG. 34). The blade portion 24 guiding below the skin 1 surface does not inhibit or resist the ability to cut. Therefore, neither the blunt tip 58 preceding in the cutting direction nor the sharp knife tip 42B trailing the cutting direction is capable of cutting, piercing or snagging any body tissues below the surface of the membrane being severed. This eliminates the need for the fingers to contact the blade portion 24 and cover the sharp knife tip 42B. Only the handle member 30 is gripped when performing these cutting operations with the knife 20 of the present invention, eliminating the possibility of the user slipping and cutting oneself and/or the viscera 5B from the fingers contacting a wet slippery blade. As the cutting hook 46 severs the skin 1, the blunt surface 44 located on the lower portion of the cutting hook 46 glides above the membrane tissue 3 surface in a direction parallel to the membrane tissue 3 and therefore serves to guide and maintain the proper orientation of the entire cutting hook 46. The ability to guide and control cutting is further increased since cutting direction is parallel to the axis 17 of the wrist 15 and forearm 16 (FIGS. 31–34). The wrist 15 and the forearm 16 are aligned with the axis 17 as shown in FIGS. 31–34, and for purposes of description the wrist 15 in FIGS. 31–33 is referred to as a straight wrist 15, whereas FIG. 29 shows the prior art knife 170 grasped with the wrist 15 not aligned with the axis 17 of the forearm 16, which is referred to as a bent wrist 15. In addition, the handle member 30 of the knife 20 is completely enclosed in the hand, eliminating any chance of the knife 20 slipping when performing these cuts. Combining these features eliminates the chance of cutting the viscera 5B and allows these cuts to be performed with greater ease, speed and safety than presently available field knives such as the knives 200.

Figure 51:
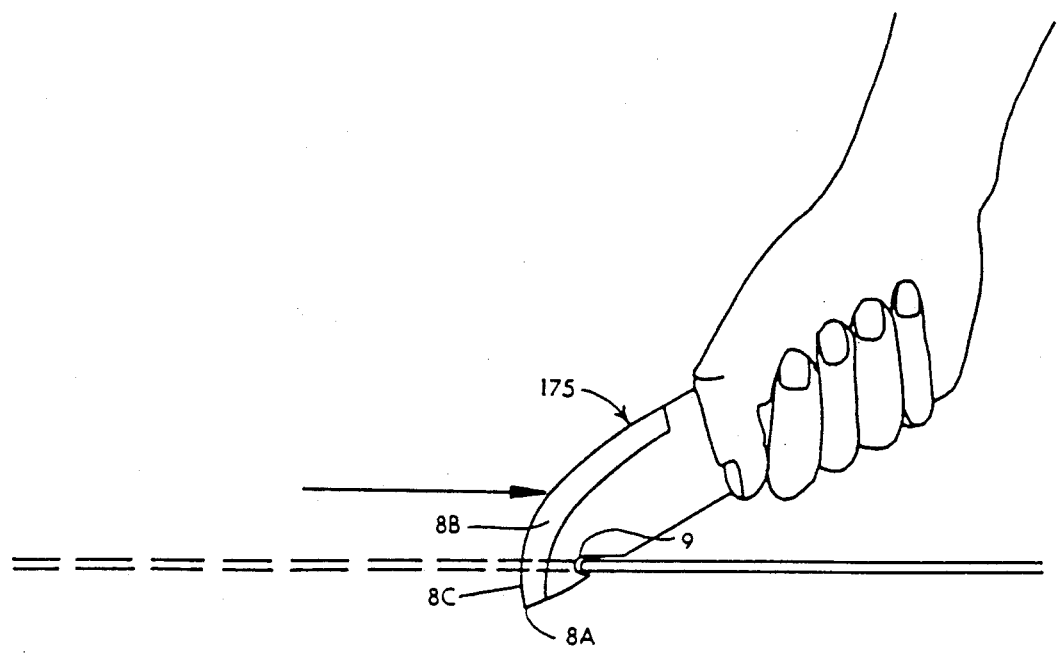
FIG. 51 is a side elevation view of a conventional field knife with a cutting hook configuration being used to sever the belly skin membrane.

There are conventional knives 175 (FIG. 51) available that include a cutting hook but do not perform as well as the knife 20 of the present invention for numerous reasons. Since the wrist 15 is bent (as shown in FIGS. 51 and 29) with the conventional knives 175 and 200, it is not possible to perform controlled forward cutting with the knife tip 8A and forward edge of the blade 8B to cut the slit 10B through the belly skin 1 for inserting the cutting hook 9 (FIG. 51). Since control of the knife tip 8A and the front edge of the blade 8B are reduced when cutting forward, the chance of piercing the viscera 5B increases. In addition, once the cutting hook 9 is inserted, the hand and handle (FIG. 51) positions are not parallel to the surface being cut and therefore, do not guide or maintain the proper orientation of the cutting hook 9 (FIG. 51) reducing performance when severing the skin 1 with the cutting hook 9. In addition, the cutting hook 9 of the conventional knife 175 may be configured so that the portion of the blade 8B from the knife tip 8A to the cutting hook 9 is not parallel to the surface being cut. This causes the knife tip 8A to point down towards the viscera 5B when the proper orientation of the cutting hook 9 is maintained (FIG. 51), increasing the chance of cutting the viscera 5B. Finally, the bent wrist grip along the blade axis is less secure than in the knife 20 of the present invention, increasing the chance of the knife 175 slipping. As a result, the cutting hook 46 of the knife 20 of the present invention has improved function over the conventional knife 175 with the cutting hook 9.

Another feature of the knife 20 of the present invention is the ability to perform controlled forward cutting with the knife tip 42B and the forward portion of the curved cutting edge 90. This feature improves the ability of the knife 20 of the present invention over the conventional knives 170 and 175 when skinning to pierce and cut the longitudinal slit 10B through the leg skin 1. When cutting the slit 10B through the leg skin 1, it is difficult to insert a conventional knife blade 8B under the skin 1 to sever the membrane tissue 3 (FIG. 29) because the skin 1 is tightly wrapped around the leg and lies very close to the bone. Using a conventional knife 170, this cut is performed with the cutting edge 8C at the knife tip 8A with the knife 170 cutting linear forwardly with the blade 8B inverted (FIG. 29). Since the wrist 15 is bent, it is difficult to control the blade 8B when cutting forward.

The knife 20 of the present invention improves function since forward cutting may be performed while maintaining a more controlled straight wrist 15 position. Once the sharp knife tip 42B pierces the skin 1, the forward portion of the curved cutting edge 90 near the sharp knife tip 42B severs the skin 1. The relatively straight blunt edge surface 44 on top of the blade portion 24 (FIG. 31) guides the forward cut since this blunt edge surface 44 contacts and glides across the membrane tissue 3 surface parallel to the skin 1 being severed on the membrane tissue 3 surface below the skin 1 in the cutting direction. As the blunt edge surface 44 contacts and glides parallel to the leg surface, the forward portion of the curved cutting edge 90 maintains an orientation relatively 90° to the skin surface. Therefore the skin 1 is severed without having to insert the forward curved cutting edge 90 under the skin 1. As a result, the knife 20 of the present invention improves the ability to perform controlled forward cutting, reducing the time required to skin.

Another function of the present knife 20 which is improved over presently available field knives is the ability to cut the membrane of the diaphragm 7. The diaphragm 7 (FIG. 25) is a thin, muscular partition which separates the thorax 10 and the abdominal cavity 11. Once the viscera 5B inside the abdominal cavity is exposed by cutting the abdominal wall membrane tissue 3, the diaphragm 7 must be cut to access the viscera 5B inside the thorax 10. Severing the membrane of the diaphragm 7 requires a 360° cut around the lateral circumference of the body cavity. Since the wrist 15 is bent when using a conventional knife, cutting the diaphragm 7 causes the wrist 15 and the forearm 16 to be rotated to uncomfortable cutting positions, resulting in muscle fatigue and increasing the chance of the user slipping and cutting oneself and the viscera 5B. In addition, the blade 8B is not always visible when cutting the diaphragm 7. Cutting when the blade 8B is not visible is referred to as blind cutting. The wrist 15 is bent when cutting blind with a conventional knife 170, therefore it is difficult to estimate and control the position of the blade 8B, further increasing the chance of cutting the viscera 5B and the user cutting oneself.

Function is improved when cutting the diaphragm 7 with the knife 20 of the present invention since the wrist 15 is straight and muscles of the forearm 16 are relaxed, allowing ease of cutting around 360° (arrows 160 in FIGS. 45, 47 and 48). In addition, a relaxed straight wrist 15 cutting position improves the ability to estimate and control the blade portion 24 when cutting blind, reducing the chance of cutting the viscera 5B or the user cutting oneself.

Figure 23:
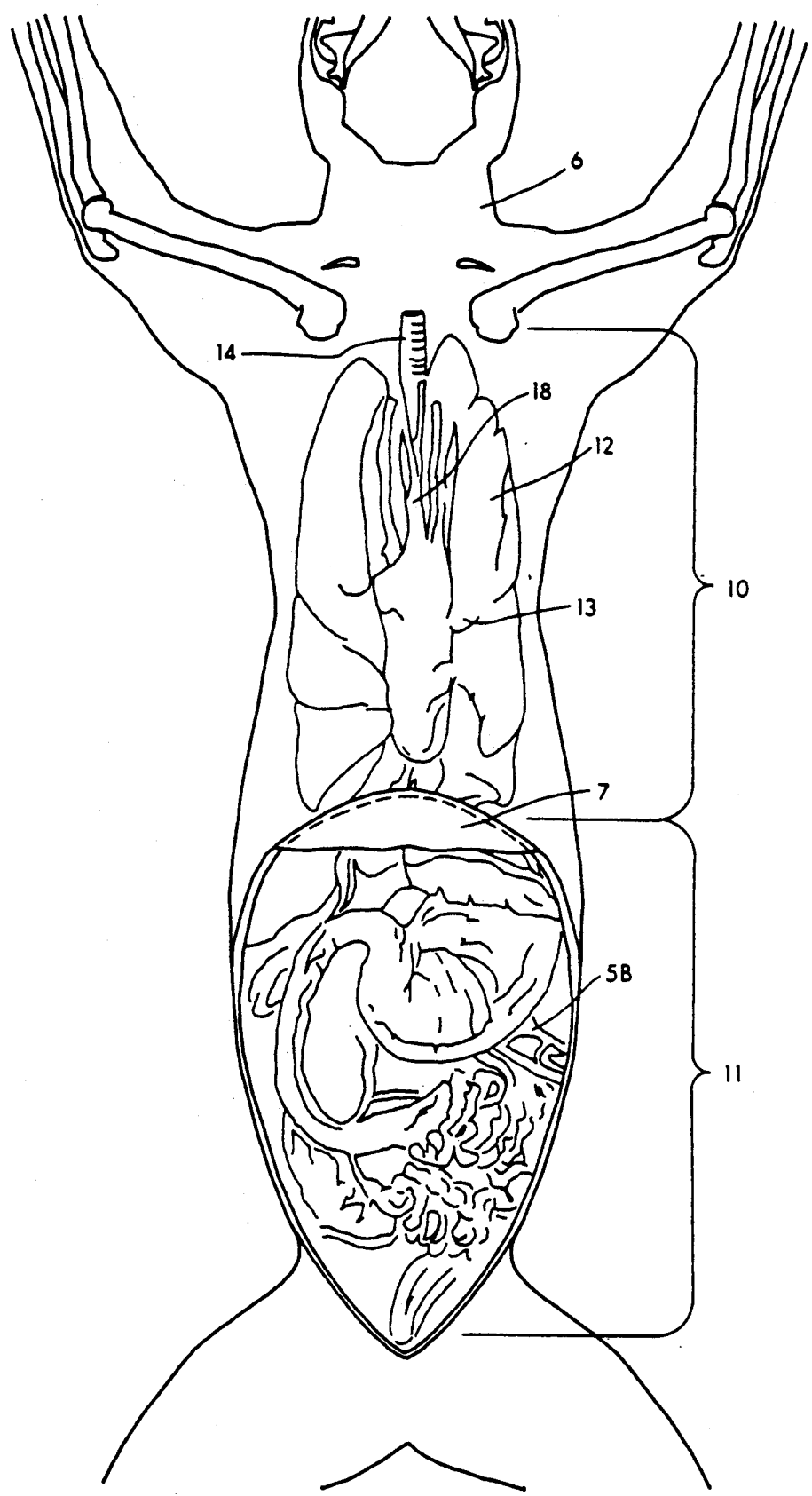
FIG. 23 is a bottom view of a cross section of an animal showing viscera inside the abdomen and thorax.
Figure 24:
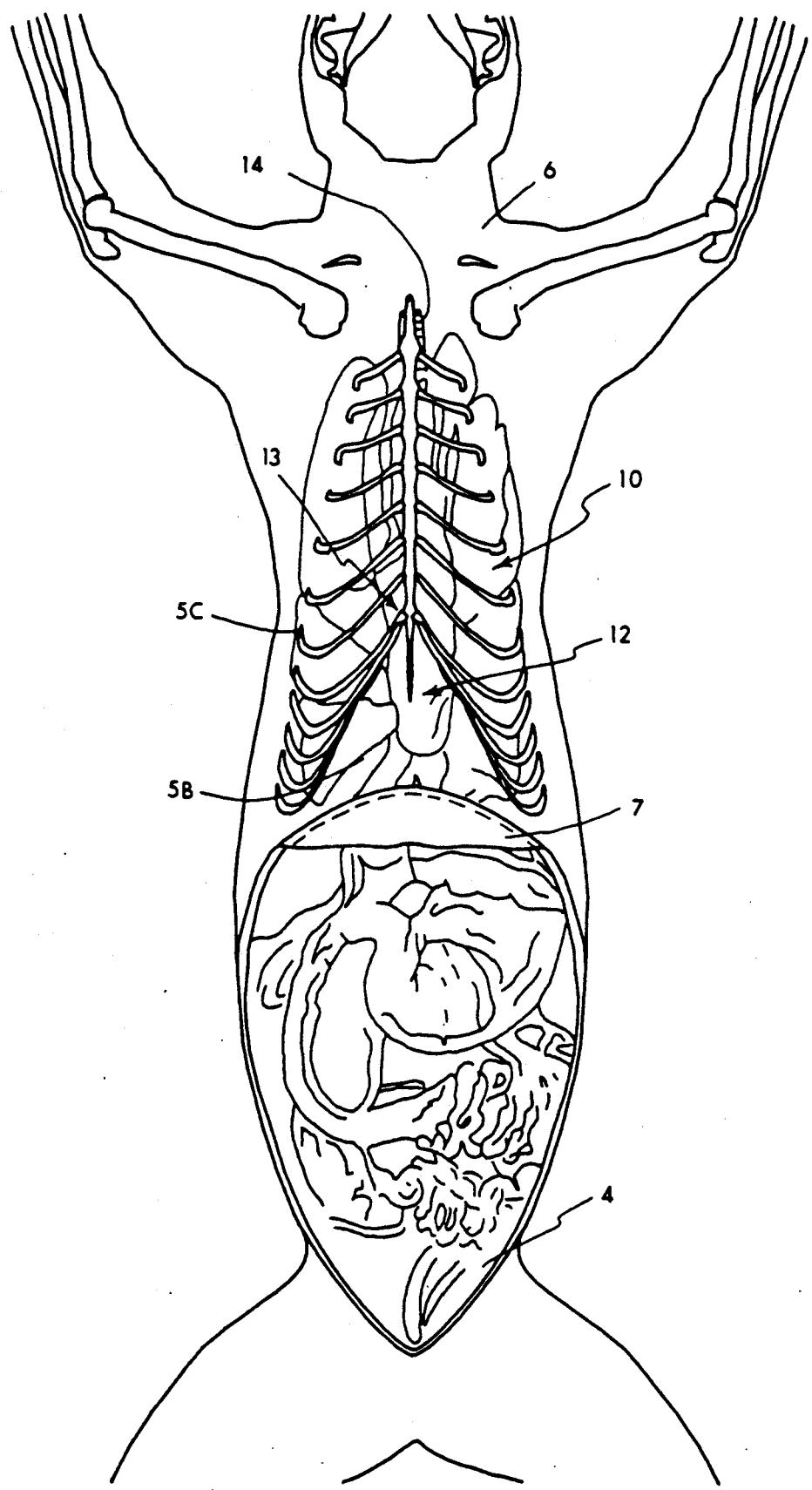
FIG. 24 is a bottom view of a cross section of an animal showing the ribs and viscera inside the abdomen and thorax.

Another improved feature of the knife 20 of the present invention is the ability to cut effectively in a cramped or confined space. This feature is particularly useful when cutting inside the abdominal cavity 11 and especially the thorax 10, to remove the viscera 5B and prevent meat spoilage (FIG. 23). If the rib cage 5C (FIG. 24) is not split and spread open before removing the viscera 5B inside the thorax 10, it is required to reach inside the confined space of the thorax 10 to cut the lungs 12, the heart 13 and the windpipe 14 free (FIG. 23). The lungs 12 are cut free by slicing the tissue connecting the lungs 12 to the thorax 10 lining. To aid in draining blood from the meat, one must reach inside the thorax 10 and sever the aorta 18, a major artery on top of the heart 13. The final cut required to empty the body cavity is to sever the windpipe 14 high up near the neck 6. Now all the viscera 5B inside the thorax 10 and the abdominal cavity 11 has been cut free and may be removed from the body cavity.

When performing these cuts inside the thorax 10, the forearm 16 must be extended with the elbow in a straight or locked position. With the conventional knife 170, maneuverability and control of the blade 8B is severely limited while cutting with a bent wrist 15 and extended forearm 16 (FIGS. 47, 50 and 51). In addition, cutting in a confined space involves blind cutting. Since a straight wrist 15 is maintained when cutting with the knife 20 of the present invention, ease of maneuvering the knife 20 with the forearm 16 extended are reasons for improved function. In addition, maintaining a straight wrist 15 position improves the ability to control and estimate blade position when the blade portion 24 is not visible, further increasing the ability to cut in a confined space.

Figure 35:
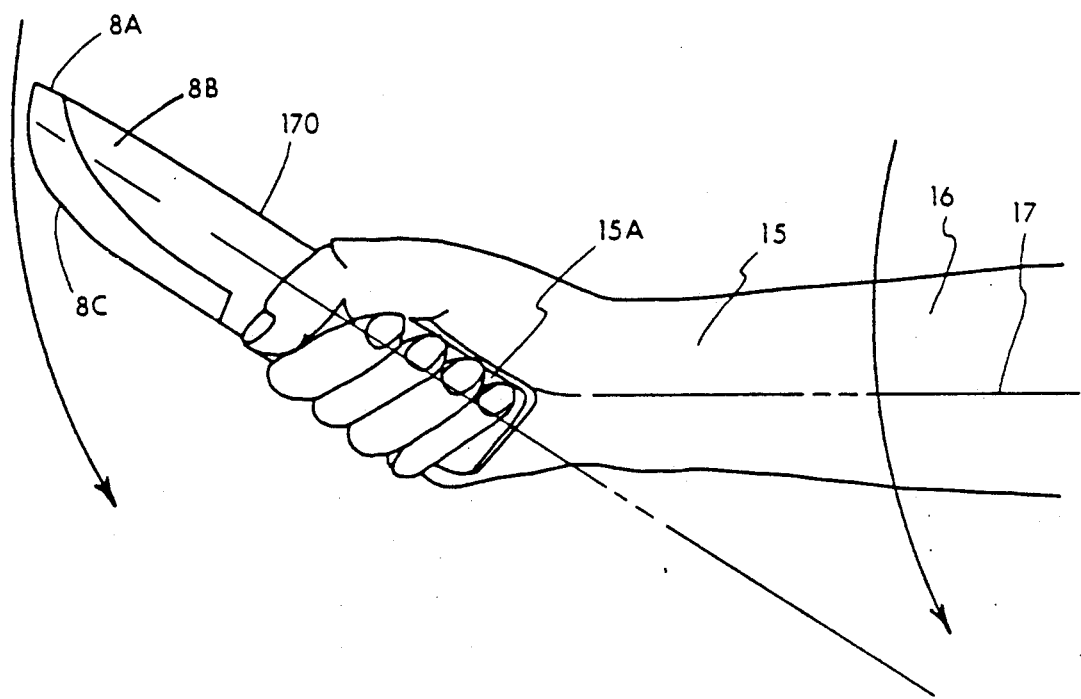
FIG. 35 is a side elevation view of a conventional field knife showing a downward cutting stroke during a skinning operation.
Figure 36:
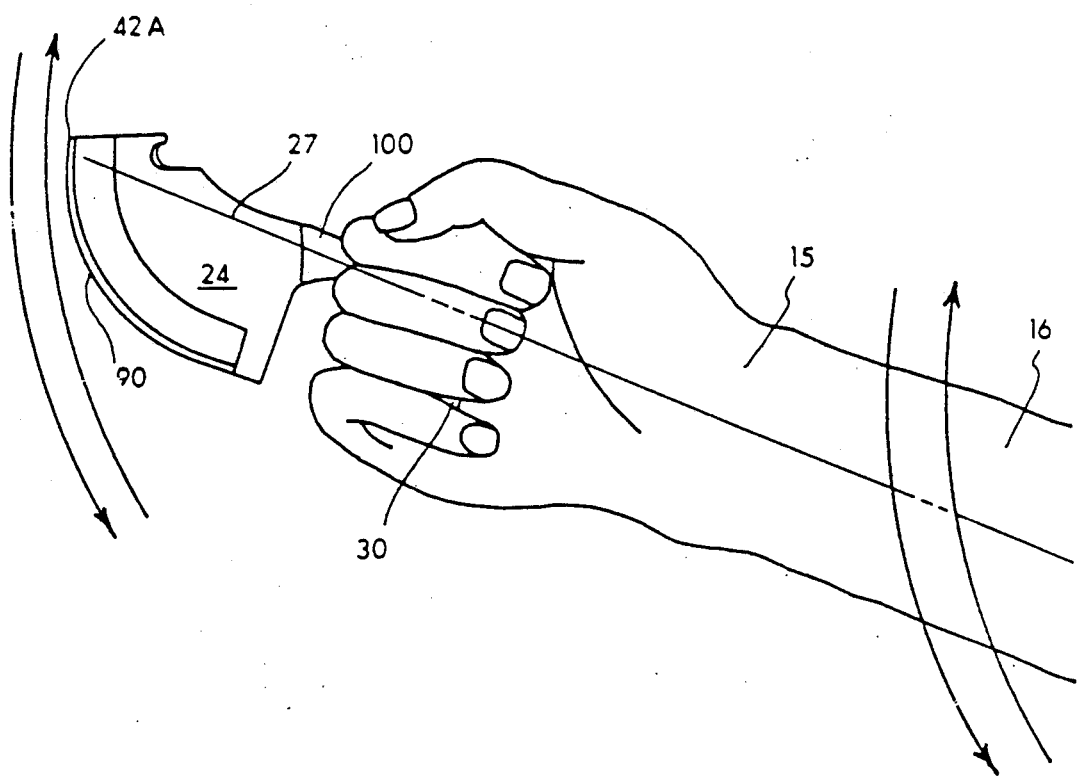
FIG. 36 is a side elevation view of the embodiment of the knife of the present invention shown in FIG. 1 showing upward and downward cutting strokes during a skinning operation.

The blade portion 24 of an effective field knife 20 has the curved cutting edge 90 comprising the sharp knife tip 42B for piercing and the relatively large radius curved cutting edge 90 initiating at the sharp knife tip 42B which may remain curved for the entire length of the curved cutting edge 90 or terminate at the rearwardly inclined straight cutting edge portion 96. To initiate skinning and gutting, the sharp knife tip 42B is required to pierce the skin 1 and the abdominal wall membrane tissue 3. Once the hole 10A is pierced with the conventional knife 170, using the sharp knife tip 8A further is undesirable since it may pierce additional holes 10A through the skin 1 when removing the hide or the sharp knife tip 8A may pierce the viscera 5B. When skinning and gutting with the conventional knife 170, cutting with a bent wrist 15 limits control of the knife tip 8A. Therefore, cutting strokes are most often performed in one direction downward with the knife tip 8A trailing the cutting stroke (FIG. 35). The large radius curved cutting edge 90 of the knife 20 of present invention combined with the straight wrist 15 position are advantageous when skinning since the curved cutting edge 90 has the ability to perform both up and down cutting strokes to sever tissue while maintaining control of the sharp knife tip 42B to prevent the sharp knife tip 42B from piercing (FIG. 36).

Another feature of the knife 20 of the present invention which improves function over presently available field knives is the handle member 30 comprising the generally oval-shaped shank portion 100 terminating at the blade portion 24, having the longitudinal blade axis 27 coaxial with the longitudinal portion of the blade portion 24 and transverse to the main handle member 30. The ability to grip the handle member 30 of the knife 20 of the present invention by both the handle shank portion 100 and the main handle member 30 provides a more secure grip than the conventional knife 170. The conventional knife 170 can only be secured by the fingers wrapped around the main handle section in a longitudinal orientation to the knife tip 8A (FIG. 35). When the knife 20 of the present invention is gripped, the handle member 30 is secured in the hand by both fingers wrapped around the main handle member 30, transverse to the longitudinal blade axis 27, and the handle shank portion 100 extends between the fingers along the blade axis 27. Therefore, the knife 20 of the present invention provides a safer, more secure grip than the conventional knife 170, reducing the chance of the knife 20 slipping.

The handle shank portion 100 is a means to secure the knife 20 between the fingers when the hand is open, allowing dexterity and use of the fingers and hand holding the knife 20 without setting the knife 20 down. Field dressing a big game animal involves many operations which require the use of both hands to grasp and pull. With the conventional knife 170, two hand operations require the knife 170 to be set down. Since the knife 20 of the present invention can be secured in an open hand, two hand operations may be safely performed without setting the knife 20 down, reducing the time required to skin, gut and quarter an animal. Two hand operations can be performed safely with the knife 20 of the present invention since the curved cutting edge 90 is directed outwardly and away from the hand and user when the hand securing the knife 20 is used to grasp and pull.

This feature greatly improves the ability of the new knife 20 to perform skinning. Skinning involves removing the animal skin 1 by cutting or peeling the membrane tissue 3 connecting the skin 1 to the body (FIG. 29). Cutting involves using the curved cutting edge 90 to sever the membrane tissue 3 connecting the skin 1 to the body. Peeling involves fracturing the membrane tissue 3 by pulling the skin 1 in tension outward from the body. When peeling, it is preferable to use both hands to grasp the skin 1 in order to pull the skin 1 free from the body. Using both hands provides a more stable grip on the skin 1, allowing the user to apply a greater force to pull the skin 1 free. The conventional knife 170 must be set down when both hands are used to peel the skin 1. In addition, using one hand to peel the skin 1 while one hand holds the conventional knife 170 is dangerous since the hand holding the knife 170 is not anchored. If the user slips when peeling, the exposed knife 170 could injure the user. With the knife 20 of the present invention both cutting and peeling may be performed consecutively without setting the knife 20 down. This reduces the time required to skin and therefore, allows for faster cooling of the meat.

Figure 37:
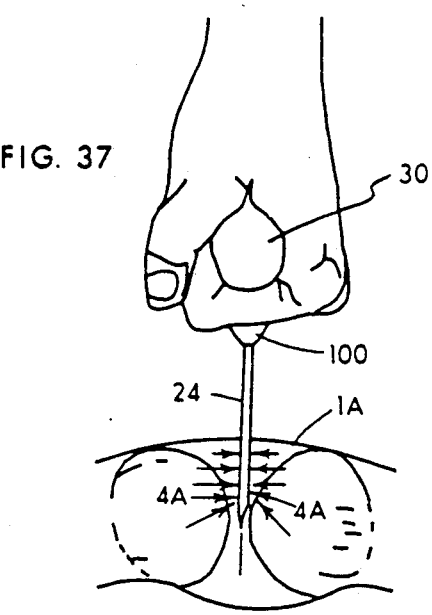
FIG. 37 is an end view of the embodiment of the knife of the present invention in FIG. 1 showing the knife being forced into the cartilage of a joint during a quartering operation. Arrows transverse to the blade surface indicate compressive forces preventing the knife from penetrating further through the cartilage.
Figure 38:
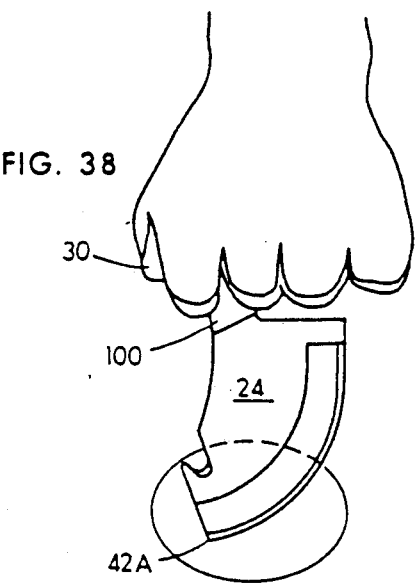
FIG. 38 is a side elevation view of the cutting operation in FIG. 37.
Figure 41:
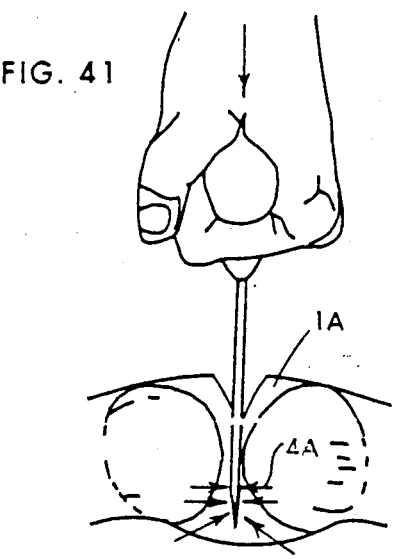
FIG. 41 is an end view of the embodiment of the knife of the present invention in FIG. 1 showing the knife cutting further through the cartilage following the cutting operation illustrated in FIGS. 39 and 40. Note the joint has been spread open and compressive forces transverse to the blade are reduced.
Figure 42:
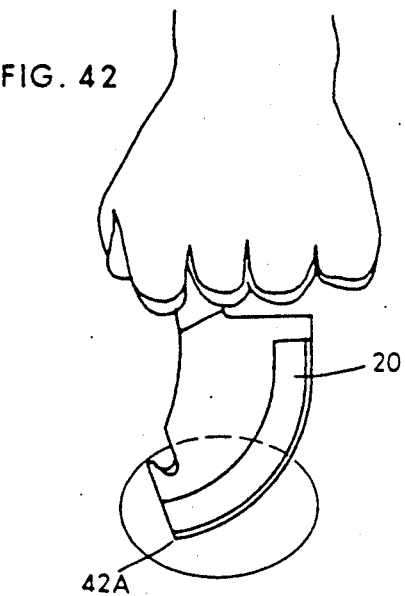
FIG. 42 is a side elevation view of the cutting operation in FIG. 41.

With the knife 20 of present invention, the ability to use both hands without setting the knife 20 down reduces the time required to quarter since the blade portion 24 can be forced into the cartilage 1A of a joint until compressive forces 4A transverse to the blade surfaces 32 and 33 (FIG. 1) cause friction on the blade portion 24, preventing the blade portion 24 from penetrating further through the joint (FIGS. 37, 38). The joint can then immediately be spread open by pulling the joint apart with both hands, reducing the compressive forces 4A on the blade portion 24 without setting the knife 20 down. Once the joint has been spread open from hand force, the blade portion 24 can immediately be forced further into the joint (FIGS. 41, 42). This function can be performed in less time with the knife 20 of present invention since it is not required to set the knife 20 down.

Presently available field knives 170 and 175 can be grouped into two categories. One category includes relatively small, short bladed knives 170 and 175 with a blade length ranging from 1.5"-3.0" and 4"-7" overall length. The second category includes large, thick, heavy-weighted knives 170 and 175 with a 5"-7" long blade and 10"-12" overall length. Properly skinning and gutting game requires intricate cutting and therefore a small knife 170 or 175 is beneficial since it is easy to maneuver and control the cutting edge 8C. However, a small knife 170 or 175 is not effective or strong enough for applying a large cutting force (arrow 1B in FIG. 50) required to quarter a big game animal. A large, weighty, thick-bladed knife 170 or 175 is capable of applying a large cutting force IB; however, cutting with a bent wrist 15 limits maneuverability and reduces blade control as blade length and weight increases. As a result, the chance of cutting the viscera 5B and piercing the skin 1 is much greater when skinning and gutting with a large, long-bladed, weighty knife 170 or 175. The knife 20 of present invention provides a strong, thick-bladed knife structure of relatively short length which also enables a relaxed, straight-wrist 15 cutting position. Therefore, the knife 20 of present invention is one tool to perform delicate, intricate cutting as well as forceful cutting to quarter game. Blade strength is sufficient to perform forceful cutting without fracturing the blade portion 24 (see stress analysis).

Another improved feature of the knife 20 of the present invention is the efficient, linear transfer of the force 1B through the arm muscles 153 to cause a cutting force 155 at the forward curved cutting edge 90 near the sharp knife tip 42B. This feature greatly improves the ability of the knife 20 of the present invention to apply the large cutting force 155 required to quarter an animal. Quartering involves dividing an animal into smaller sections by severing points of the skeletal system. Quartering aids to cool meat more rapidly by exposing a greater surface to the atmosphere and aids in transporting the carcass from the field. Quartering involves severing the cartilage 1A, the tissue connecting the bone, or the bone itself. Severing bone and the cartilage 1A requires much greater cutting force 155 than cutting the skin 1 and flesh. Sections of an animal which are severed when quartering game in the field include the brisket, to spread open the rib cage 5C to cool the meat and allow easy access to remove the viscera 5B inside the thorax 10, the spine up near the neck 6 to sever the head from the body, the spine between the pelvis and the thorax 10 to separate the rear haunches from the thorax 10, and the pelvic bone to separate the rear haunches from the pelvis.

Conventional knives 170 and 175 do not efficiently transfer arm force 1B to cutting force 155. An axe, saw or large, heavy-bladed knife are tools which are commonly used to cut through the bone and the cartilage 1A. Many hunters prefer to take afield both a small-bladed, lightweight knife for skinning and gutting and an axe, saw or large, heavy-bladed knife to quarter. A conventional knife 170 is inefficient when applying a large cutting force 155, because linear arm force 1B is not transferred directly through the arm 16 to the front cutting edge 5A (FIG. 50). As a result, only part of the force 1B transferred through the arm muscles 153 to the knife handle 15A results in the cutting force 155. The part of arm force 1B which does not result in the cutting force 155 generates a torque around a center point 156 between the point where the linear arm force 1B is applied to the handle 15A and where the linear cutting force 155 is transferred to the cutting edge 8C. This torque causes inefficient transfer of the arm force 1B to the cutting force 155, generates bending stresses in the knife 170 and forces the wrist 15 to become unstable as the arm force 1B is applied to the handle 15A.

When applying a large cutting force 1B with the knife 20 of the present invention, the arm force 1B is transferred to the cutting force 155 directly and linearly through the arm 16 to the forward curved cutting edge 90 (FIG. 49). The cutting force 1B is transferred more efficiently since torque and bending forces do not occur in the knife 20 or the wrist 15. In addition, a straight wrist 15 position adds stability and provides a secure grip. This allows the user to apply a greater amount of the arm force 1B to the handle member 30 of the knife 20 of the present invention than the conventional knife 170 and reduces the chance of the knife 20 slipping. In addition, only the compression forces 4A are applied to the knife 20. Steel is several times stronger when stressed in compression than when an equal amount of bending stress is applied. The direct transfer of force eliminates bending stresses in the knife 20 of the present invention, reducing stresses which may cause the blade portion 24 to fail. Therefore, a conventional knife blade 8B must be stronger than the blade portion 24 of the knife 20 of the present invention to prevent the blade 8B from failing when an equal amount of forward cutting force 155 is applied to the handle of each knife. The knife 20 of the present invention provides a knife structure capable of applying greater cutting force 155 more efficiently with greater ease, safety and comfort to the user than previous knife designs.

Another improved feature of the knife 20 of the present invention is the ability to generate a greater amount of twisting force (torque) 160 than presently available field knives. Using the conventional knife 170 the twisting force 160 is generated in the knife blade 8B by rotating the wrist 15 (FIG. 47). Therefore, the torque 160 is limited by strength of the wrist muscles. Twisting ability is further limited because the torque 160 is applied directly from the hand to the handle 15A (FIG. 48). Therefore, only frictional forces from the fingers compressing the handle 15A prevent the knife 170 from slipping. When the handle 15A becomes wet with blood and body fluids, friction and twisting ability is greatly reduced. This is because the handle 15A and the blade 8B lie along the axis 20A of twist 20A (FIG. 47).

The ability to apply the torque 160 with the knife 20 of present invention is improved because the wrist 15 and forearm 16 maintain a more stable straight position. Twisting incorporates muscles of the entire forearm 16 and wrist 15 to generate the torque 160 in the blade portion 24 (FIG. 45). When twisting, handle member 30 is held in an attitude transverse to the blade portion 24 and the axis 20A of twist. As a result, the torque 160 is transferred to the blade portion 24 indirectly by applying linear force (arrows 176) directly to the top portion 112 and the bottom portion 114 of the handle member 30 (FIG. 46), generating the torque 160 about the center of the handle shank portion 100 which is transferred directly to the blade portion 24. Since the torque 160 is applied indirectly to handle member 30, grip is not effected by frictional forces. Therefore, the knife 20 of present invention provides a safe, secure grip when twisting, if handle member 30 becomes wet or bloody.

Figure 39:
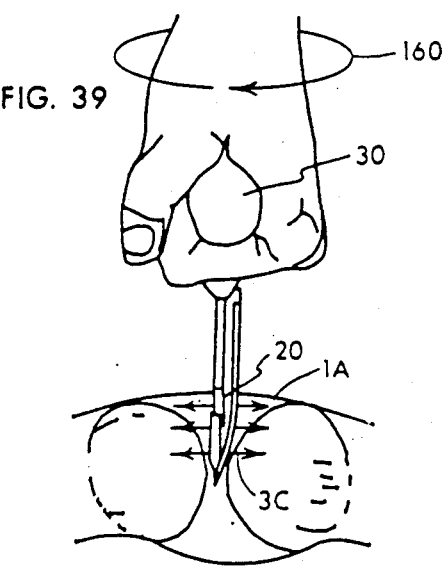
FIG. 39 is an end view of the embodiment of the knife of the present invention in FIG. 1 showing the knife handle being twisted to apply torque to a portion of the blade inserted in the joint, following the cutting operation illustrated in FIGS. 37 and 38. Arrows transverse to the blade surface indicate linear forces transferred to the joint from blade torque.
Figure 40:
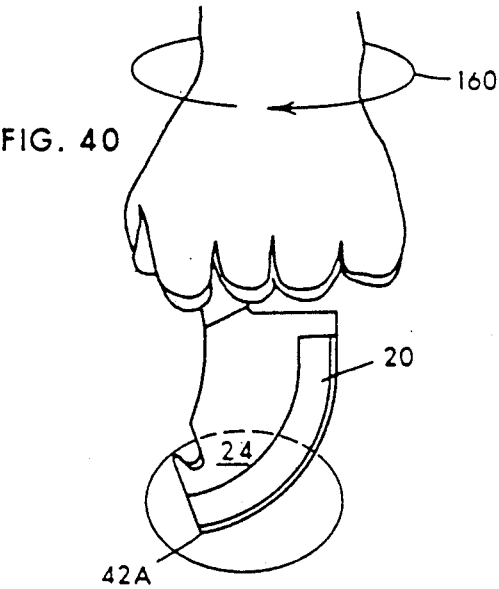
FIG. 40 is a side elevation view of the cutting operation in FIG. 39.

The ability of the knife 20 of the present invention to apply a greater amount of the torque 160 to a surface improves the function of the knife 20 over previous knife designs to quarter game. When cutting cartilage 1A to sever joints on the skeleton, the knife blade portion 24 is forced into the cartilage 1A (FIG. 38). As a result, natural compressive forces holding the joint together result in the transverse linear compressive forces 4A applied to the blade portion 24 (FIG. 37), causing excessive friction on the flat parallel side surface portions 32, 33, 92, 94, and preventing the blade portion 24 from cutting further through the joint. The compressive forces 4A on the blade portion 24 can be reduced by twisting the knife handle member 30 to apply the torque 160 to the section of blade portion 24 inserted in the cartilage 1A (FIGS. 39, 40). Torque 160 transferred from the blade portion 24 to the joint generates the linear forces 3C which serve to spread the joint open, reducing the compressive forces 4A transverse to the flat parallel side surface portions 32, 33, 92 and 94. This improves the ability of the knife 20 to cut further through the cartilage 1A (FIGS. 41, 42).

Figure 43:
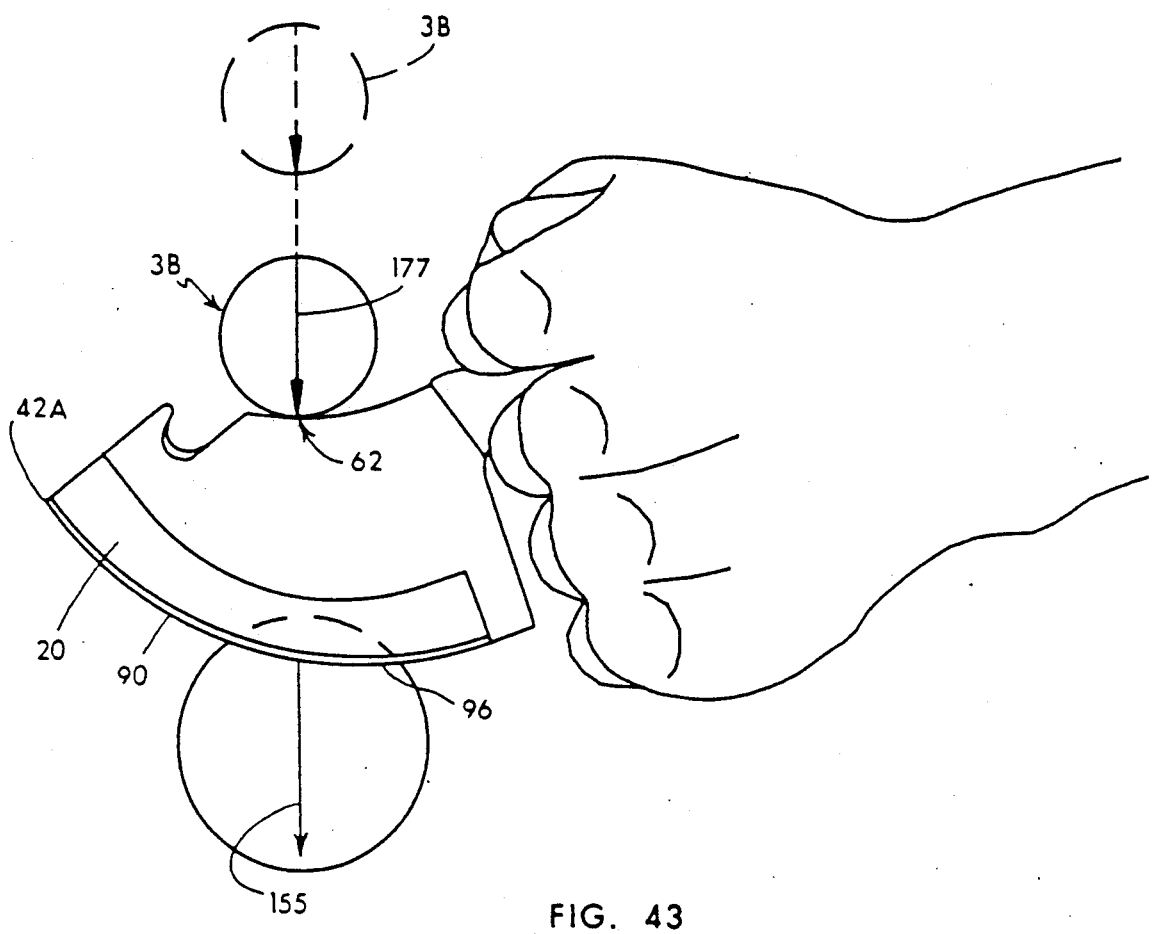
FIG. 43 is a side elevation view of the embodiment of the knife of the present invention in FIG. 1 showing the knife being used to transfer impact force to the cutting edge in a quartering operation by striking the top of the blade with a foreign object.

Another feature of the knife 20 of the present invention is the ability to transfer a large impact force 177 to the curved cutting edge 90 by striking the upwardly curved upper blade surface 62 of the blade portion 24 with a foreign object 3B encountered in the field, such as a rock or piece of wood (FIG. 43). This feature improves the ability of the knife 20 of the present invention to apply a large cutting force 155 to quarter game. Thin, short-bladed, conventional skinning and dressing knives 170 or 175 designed for intricate cutting are not strong enough to transfer impact force by striking the top edge of the blade 8B without weakening or fracturing the blade 8B. It is possible to perform this function with a large, thick, heavy-bladed conventional knife 170 or hand axe. However, the ability to perform intricate cutting required to skin and gut with a large, heavy-bladed cutting tool is limited. The knife 20 of the present invention provides a strong thick blade portion 24 structure for transferring an impact force to the curved cutting edge 90 by striking the upwardly curved upper blade surface 62 of the blade portion 24 without fracturing the blade portion 24 (see stress analysis).

Figure 44:
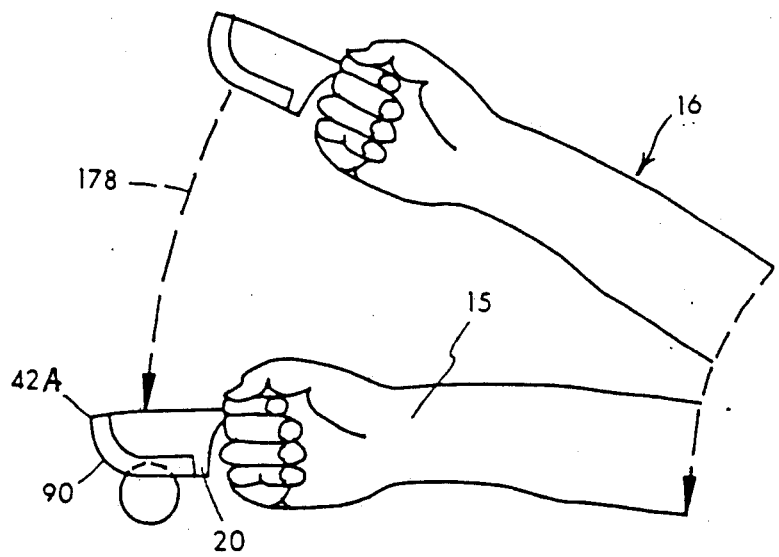
FIG. 44 is a side elevational view of an embodiment of the knife of the present invention showing a two part sequence where the knife is being used to apply a kinetic impact cutting force to a surface, in a downward motion, when the knife is used in a quartering operation.

Another feature of the knife 20 of the present invention is the ability to apply a kinetic impact cutting force 178 to a surface (FIG. 44). This is another means which improves the ability of the knife 20 of the invention to apply a large cutting force 178 to quarter game. The portion of the curved cutting edge 90 used to apply impact cutting force 178 is the forward facing edge portion initiating at the rearward end of straight cutting edge portion 96 terminating at a point where the edge radius increases, curving up towards the tip 42B.

When applying the kinetic impact cutting force 178 to a surface, the forearm 16 moves in a circular motion. The elbow or shoulder are the center point of motion while the sharp curved cutting edge 90 of the cutting tool impacting the surface acts as the outside radius of circular motion. When using the cutting edge 8C of a conventional knife 170 or axe to apply a kinetic impact cutting force 178, the wrist 15 is bent. When the blade 8B impacts the surface, it encounters opposing forces in the direction 180° opposite to downward motion, resulting in an upward torque applied to the wrist 15. Since the wrist 15 is bent when using a conventional knife 170 or axe, grip is less stable to absorb this torque.

When using the knife 20 of the present invention to apply the impact force 178, grip maintains a more stable straight wrist 15 position to absorb torsional impact force. Therefore, a greater kinetic impact force 178 may be applied to a surface with the knife 20 of the present invention than a conventional knife 170 of equal mass and length.

STRESS ANALYSIS SUMMARY

A stress analysis was performed on the handle-blade connection to determine the minimum required thickness to prevent the knife 20 from failing at this section. Under normal use such as cutting and slicing, a knife is not subjected to very large forces. When quartering, the knife 20 is directly forced, torqued and impacted which generates higher stresses in the knife 20. Therefore, the loading conditions for this stress analysis were equal to much greater forces which would constitute abuse and unsafe use of the knife 20. These loading conditions were approximate values for the maximum amount of force 1B the hand can apply to the knife. For example, maximum forward force 1B equals 125 pounds and maximum twisting force 160 equals 225 in-lb.

Three stress conditions were selected to simulate three types of overloading. These conditions are (1) downward cutting and twisting; (2) prying and twisting; and (3) forward push and twist. Of these three, stress condition 2 results in the highest stress values; therefore, the stress analysis was based on this condition.

Tempered and heat treated 440-C stainless steel was chosen as the blade material because of the high strength and hardness of this metal. 440-C has a yield strength of 275,000 psi and a Rockwell-C scale hardness of 58-60.

RESULTS

For 3/16 inch steel, a minimum thickness of 0.30 inches is required to meet these loading conditions. For 0.15 inch steel, a minimum blade shank thickness of 0.35 inches is required. It is possible to produce a knife 20 with less blade and shank thickness; however, chance of the knife 20 failing at this section is increased when large forces are applied.

Figure 26:
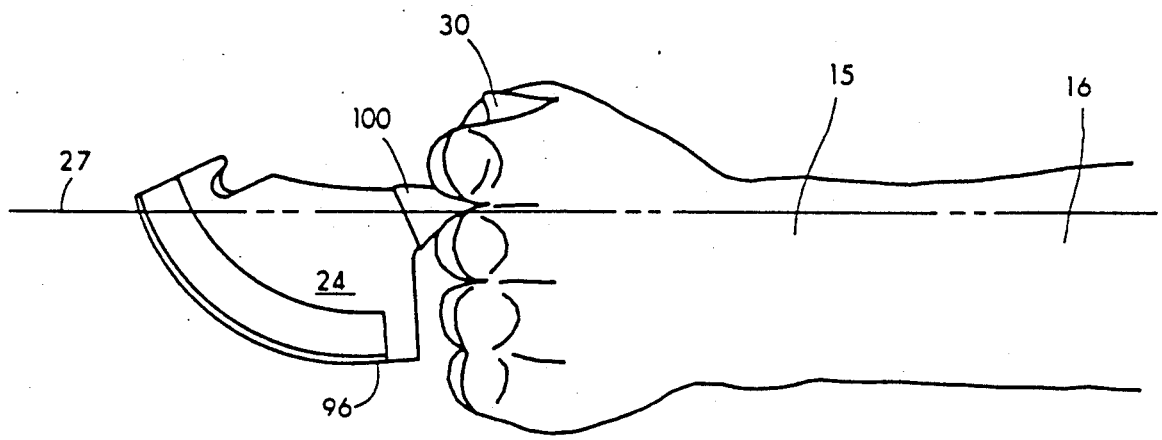
FIG. 26 is a side elevation view showing a manner of gripping the embodiment of the knife of the present invention in FIG. 1 when the handle shank extends between the index and middle fingers.
Figure 27:
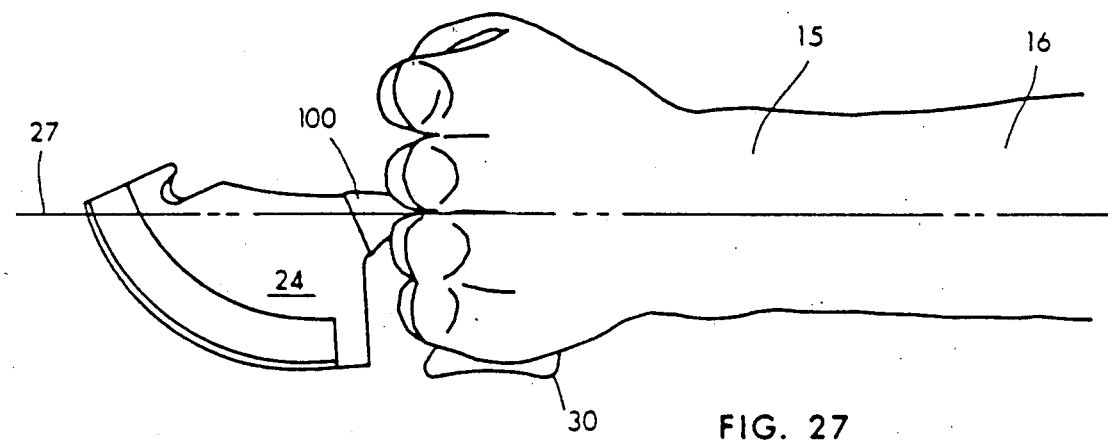
FIG. 27 is a side elevation view showing a manner of gripping the embodiment of the knife of the present invention in FIG. 1 when the handle shank extends between the middle and second fingers.
Figure 28:
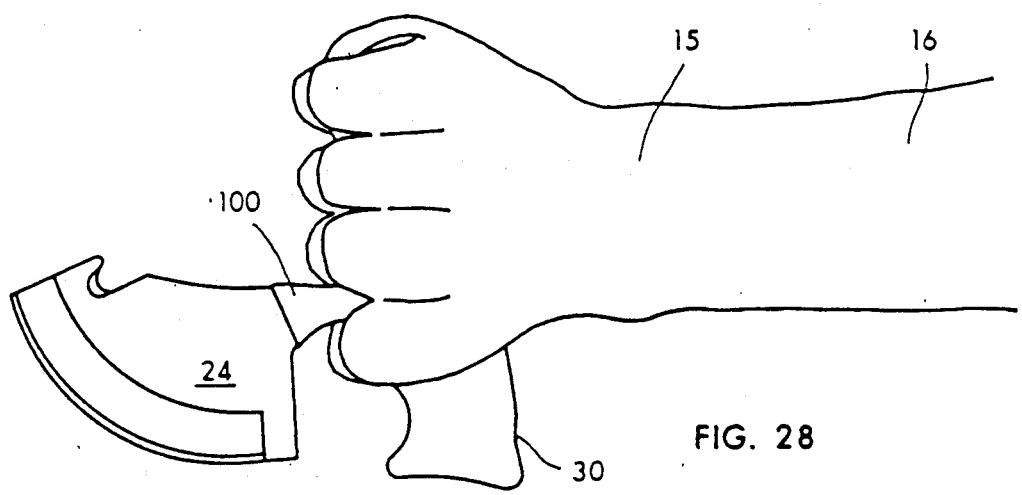
FIG. 28 is a side elevation view showing a manner of gripping the embodiment of the knife of the present invention in FIG. 1 when the handle shank extends between the second finger and pinky.

There are two main differences between the knife 20 of the present invention and the conventional knives 170 on the market today. One main difference is the unique handle member 30. When held, the blade 8B of a conventional knife 170 extends out from either the top or bottom of the hand. Therefore, a conventional knife 170 is secured by the fingers of a closed hand wrapping around the handle 15A which lies in a longitudinal orientation, coaxial to the knife blade 8B (FIG. 47). With the knife 20 of present invention, the blade portion 24 extends out from between two adjacent fingers which include the index and the middle finger, the middle finger and the second finger or the second finger and the pinky when the hand is closed (FIGS. 26, 27 and 28). The knife 20 is secured by both fingers of a closed hand wrapping around the main handle member 30 transverse to the knife blade portion 24 and the handle shank portion 100 extending between two adjacent fingers (FIGS. 26-28).

The second main difference between the knife 20 of the present invention and the conventional knives 170 on the market today is the function of the cutting hook 46 on the knife blade portion 24. This cutting hook 46 greatly improves the ability to initiate the process of skinning and gutting a big game animal by piercing and severing the belly skin and the abdominal wall membrane tissue 3 without changing grip or knife orientation. In addition, these cuts are performed while eliminating any chance of cutting the viscera 5B and ruining the meat or the user cutting oneself.

Handle embodiments illustrated in FIGS. 10-17 do not include the cutting hook 46; however, these embodiments have improved function over presently available field knives to perform controlled forward cutting with the forward curved cutting edge 90 and the tip 42B (FIG. 31). Because of the unique handle member 30, forward cutting ability and the cutting hook 46, the knife 20 of the present invention has many advantages when compared to the conventional knives 170, especially when used to skin, gut and quarter game animals. Since these advantages were described in detail in the general description, these advantages will now be listed and briefly described. These advantages include:

1) Firm Comfortable Grip

When held, the handle member 30 of the knife 20 of the present invention is completely enclosed in the hand, providing a firm grip. The handle member 30 is grooved and contoured, including the finger grip portions 116, 126 and 128 (FIG. 19) which provide more comfort and control for the user.

2) A Safe Grip

The handle member 30 of the knife 20 of the present invention is gripped by both fingers, wrapped around the main handle section, transverse to the longitudinal blade axis 27, and by the handle shank portion 100 extending between the fingers, along the blade axis 27. As a result, it is difficult for the blade portion 24 to slip sideways or up and down. The metal of the blade portion 24 curves down spaced from the fingers gripping the lower finger grip portions, 128 and/or 126, turns 90° and extends forward, exposing the sharp straight cutting edge portion 96. The metal which curves spaced from the finger acts as a finger guard so the fingers cannot slip over the sharp straight cutting edge portion 96. This is illustrated in FIG. 49.

3) Variable Grips

Figure 53:
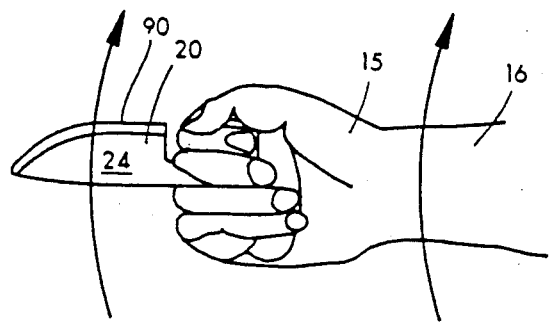
FIG. 53 is a side elevation view showing the manner of gripping a knife of the present invention when cutting upward.
Figure 52:
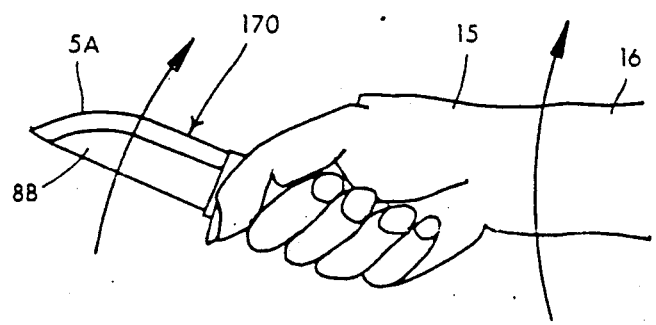
FIG. 52 is a side elevation view showing the manner of gripping a conventional knife when cutting upward.

The knife 20 of the present invention can be held in a variety of ways including, but not limited to, grips illustrated in FIGS. 26-28 and 32. When large forces (e.g., 1B) are applied to the knife 20, it should be held as shown in FIG. 26, since handle member 30 is completely enclosed in the hand. For upward cutting the knife 20 can be inverted with the curved cutting edge 90 in line with the thumb as shown in FIG. 53.

4) Ease of changing blade direction

When using a conventional knife 170, cutting direction is varied by rotating the forearm 16 while the wrist 15 is bent. This causes the wrist 15 and the forearm 16 muscles to extend and contract as the forearm 16 rotates. To change cutting direction with the knife 20 of the present invention, the forearm 16 rotates while the wrist 15 and the forearm 16 maintain a straight, relaxed position (FIG. 45). As a result, the knife 20 of the present invention allows variation of blade direction with greater ease, safety, increased control, a more stable straight wrist 15 position and less muscle fatigue.

5) Improved Ability To Generate Torque in the Blade

Using a conventional knife 170, the twisting force (torque) 160 is transferred directly from the hand to the handle by rotating the wrist 15 (FIGS. 47, 48). Therefore, the torque 160 of the knife 20 is limited by the strength of the wrist muscles. The torque 160 of the knife 20 of the present invention is much greater than a conventional knife 170 since the muscles 153 of the entire forearm 16, as well as the wrist 15, are employed to transfer the torque 160 to the blade portion 24.

Using a conventional knife 170, the torque 160 is transferred directly from the hand to the knife 170 along the axis 20A of twist (FIGS. 47, 48). Therefore, the blade torque 160 depends entirely upon frictional forces between the hand and the handle 15A, preventing the knife 170 from slipping. Friction and blade torque 160 are greatly reduced when the handle 15A becomes wet with blood and body fluids. Since the main handle member 30 of the knife 20 of the present invention is transverse to the blade axis 27, the torque 160 is transferred indirectly to the knife 20 by the linear forces 176 applied to the respective top and bottom portions 112 and 114 of the handle member 30, generating the torque 160 around the center of the handle shank 100 (FIG. 46). Since the torque 160 is applied indirectly to the knife 20, frictional forces have minimal effect upon the blade torque 160 when the handle member 30 becomes wet with blood and body fluids. The ability to generate greater torque 160 with the knife 20 of the present invention improves safety, grip and reduces muscle fatigue when quartering game.

6) Greater Angle of Blade Rotation

When using a conventional knife 170, a bent wrist 15 position restricts blade 8B rotation from the elbow, limiting the maximum angle of blade rotation to 225°. With the knife 20 of the present invention, a straight, relaxed wrist 15 position allows rotation from the shoulder enabling 360° of rotation, improving maneuverability and a greater range of cutting directions for various cutting operations.

7) Greater Twisting While Prying Ability

The prying ability of the knife 20 of the present invention and the conventional knife 170 are about equal. However, when prying and twisting are combined, the knife 20 of the present invention generates greater forces than the conventional knife 170 improving the ability to quarter game.

8) Greater Forward Force

A conventional knife 170 does not transfer forward cutting force 155 directly through the arm 16 to the front cutting edge 5A (FIG. 50). In addition, a conventional knife 170 requires a bent wrist 15 position when applying forward cutting force 155. As a result, only part of the force 1B transferred from the arm 16 to the front cutting edge 5A results in the cutting force 155 (FIG. 50). The part of the force 155 which does not result in cutting generates torque about the center point 156 between the points where the force 1B is applied to the handle 15A and where the cutting force 155 is transferred to the front cutting edge 5A and forces the wrist 15 to bend as the force 1B is applied to the handle 15A. The knife 20 of the present invention (FIG. 49) transfers the forward cutting force 155 directly through the forearm 16 to the front curved cutting edge 90 while maintaining a more stable straight wrist 15 position (FIG. 49).

As a result, the knife 20 of the present invention improves the ability to apply a greater forward cutting force 155 with improved safety, grip stability and less muscle fatigue than conventional knives 170, improving the ability to quarter game.

9) Greater Forward Cutting Force While Twisting

Since the new invention generates both greater twisting and forward cutting force 155 than a conventional knife 170, the knife 20 of present invention improves the ability to quarter game (see FIGS. 37-42).

10) Ability to secure knife in an open hand

Field dressing involves many two-hand operations which require a conventional knife 170 be set down. The handle shank 100 of the knife 20 of the present invention is a means to secure the knife 20 between the fingers, allowing use of both hands to grasp, pull and work without setting the knife 20 down, reducing the time required to skin, gut and quarter with a conventional knife 170.

11) Greater control when cutting forward with the knife tip 42B and curved cutting edge 90.

When cutting forward with a conventional knife 170, the wrist 15 is bent greatly limiting control (FIG. 29). The knife 20 of the present invention enables a straight wrist 15 position, relatively parallel to forward cutting direction (FIG. 31) and provides the blunt, straight edge surface 44 which guides forward cutting, gliding relatively parallel to the surface being cut, improving the ability of the knife 20 of the present invention to sever the skin 1 and the abdominal membrane tissue 3 by cutting forward.

12) Ability to pierce and cut a relatively short length forward slit 10B through the skin 1 and the membrane tissue 3, followed by a rearward slit 10B through the belly skin 1 through the membrane tissue 3 without changing grip or blade orientation while eliminating any chance of piercing the viscera 5B.

This function is performed with the cutting hook 46 of the knife 20 embodiments illustrated in FIGS. 1–9. Cutting forward, the sharp knife tip 42B pierces the skin 1 (FIG. 32). Forward cutting continues as the straight blunt edge surface 44 glides relatively parallel to the skin 1 surface. Forward cutting terminates when straight blunt edge surface 44, from the blade tip 42B to the curved blunt surface 58, drops below the surface of the skin 1 (FIG. 33). At this point cutting direction changes 180° opposite to forward cutting as the arcuate cutting edge portion 52 severs the skin 1 (FIG. 34). As the cutting edge portion 52 severs the skin 1, the straight blunt edge surface 44 glides above the membrane tissue 3, parallel to the skin membrane tissue 3. As a result, only cutting direction changes to perform these cuts, grip and knife orientation remain the same, improving the ability to sever the belly skin 1 and the abdominal wall membrane tissue 3 with the knife 20 of the present invention. The handle member 30 is inclined about 10° and the cutting slot about 20°.

13) Ability to sever belly skin 1 and abdominal wall membrane tissue 3 without requiring the fingers contact the blade portion 24 and conceal the tip 42B.

Since the knife 20 of the present invention enables belly skin 1 and abdominal membrane tissue 3 cutting without moving the tip 42B or the straight cutting edge portion 96 in a direction towards the viscera 5B, there is no need for the fingers to conceal the tip 42B. As a result, these cuts are performed without having the hand contact the blade portion 24.

14) Relatively small compact cutting tool with the capability of generating large cutting forces 155 as well as delicate intricate cutting strokes.

As a result of the unique design, the knife 20 of the present invention enables a relaxed, straight wrist 15 position for intricate cutting and a more stable grip which allows greater torque 160 ability and forward cutting force 155 ability than the conventional knives 170.

15) Ability to apply impact cutting force 177 by striking the upwardly curved upper blade surface 62 of the blade portion 24.

The knife 20 of the present invention is designed with sufficient strength to impact the upwardly curved upper blade surface 62 of the blade portion 24 (FIG. 43) to transfer the cutting force 177 without fracturing the blade portion 24 (see stress analysis).

16) Ability to apply kinetic impact force 178.

A more stable, straight wrist 15 position with the knife 20 of the present invention is more effective for applying the kinetic impact force 178 than the bent wrist 15 of a conventional cutting tool (FIG. 44.)

17) Ability to apply a large forward cutting force 155 with minimum stress on the knife 20 which may cause the knife 20 to fail.

When a downward cutting force 155 is applied to a conventional knife 170, compression and bending stresses are applied to the knife 170 (FIG. 50). With the knife 20 of the present invention, only compression stress is applied to the knife 20 when cutting forward (FIG. 49). Since steel is several times stronger in compression than bending, bending stress will cause a knife to fail before an equal amount of compression stress.

18) Greater blade portion 24 control when the knife 20 is not visible.

Since the blade portion 24 extends directly from the front of the hand while maintaining a straight wrist 15, it is easier to control the blade portion 24 of the knife 20 of the present invention than while maintaining the bent wrist 15 using a conventional knife 170, especially when the blade portion 24 is not visible. This greatly improves the ability to cut inside the body cavity 11 when gutting.

19) Greater control and maneuverability when cutting in a cramped or confined space.

A straight wrist 15 position improves maneuverability and control over a conventional knife 170, greatly improving the ability to cut inside the confined space of the body cavity 11 when gutting.

20) Greater dexterity when cutting around 360°

The knife 20 of the present invention allows dexterity around 360° of knife 20 rotation from the shoulder to the hand, while maintaining a relaxed straight wrist 15. The forearm 16 muscles 153 are extended and contracted when rotating with a conventional knife 170, severely reducing dexterity and the angle of rotation.

21) Ability to remove the skin 1 with up and down cutting strokes without piercing the skin 1.

A bent wrist position limits control of the tip 8A with a conventional knife 170. As a result, only downward strokes are performed when skinning (FIG. 35). A straight wrist 15 position and the curved cutting edge 90 allow control of the tip 42B to perform upward and downward cutting strokes when skinning (FIG. 36), reducing the time required to skin.

Various features of the knife 20 of the present invention may be employed to provide knives which are useful for purposes other than cutting, skinning and dressing game animals. Such uses may include cutting and dressing of fish, fowl and domestic animals such as cattle, pigs, sheep and the like. Thus, it is contemplated that the inventive concepts herein described may be variously otherwise embodied and it is intended that the appended claims be construed to include alternative embodiments of the invention, except insofar as limited by the prior art.

What is claimed is:

1. A cutting knife for dressing and skinning an animal, the animal having skin and facia below the skin, comprising:

elongated blade means having a longitudinal blade axis extending between opposite front and rear end portions of said blade means and a lowermost cutting edge portion located on said front end portion of said blade means for cutting an animal; and elongated handle means mounted on said rear end portion of said blade means and having a longitudinal handle axis extending transversely to said longitudinal blade axis at an angle selected to enable gripping by the hand and the fingers of a user of the knife with the user's wrist straight with respect to the user's forearm, said handle means having a handle extending on a given side of said blade axis, said handle having an end at said given side;

said blade means further comprising:

a forward cutting edge portion extending in a curved path forwardly from said lowermost cutting edge portion and terminating in a cutting tip portion; and an upwardly rearwardly-inclined blunt surface portion on said given side of said blade axis and intersecting said cutting tip portion for guiding said knife along the facia of the animal during forward motion of said knife, wherein said forward motion is generally parallel to the straight wrist and forearm to position said cutting tip portion to slit the skin of the animal while the user's wrist remains straight and said blunt surface guides said knife without cutting the facia.

2. A knife according to claim 1, further comprising:
said blunt surface portion extending from said cutting tip portion rearwardly along a portion of a given path, said given path extending from said cutting tip portion adjacent to said end of said handle, said given path also extending generally parallel to said straight wrist.

3. A knife for cutting, piercing and skinning animals and carcasses, said animals and carcasses having skin, facia underlying the skin and membrane tissue between the skin and the facia, said knife comprising:

elongated blade means having a longitudinal blade axis for cutting, piercing and skinning operations; and handle means secured to said blade means and having a longitudinal handle axis transverse to the longitudinal blade axis, said handle means having a first portion located on one side of the longitudinal blade axis and a second portion located on the other side of the longitudinal blade axis for enabling the knife to be held in upright and inverted operating positions wherein the wrist of the operator is in a straight unbent position relative to the forearm of the operator, with the wrist in the unbent position the forearm being free to rotate around the elbow of the operator and being free to move around the shoulder of the operator to move the unbent wrist and said knife for upward and downward cutting strokes without having to rotate the wrist and the forearm around their common longitudinal axis;

said blade means further comprising:

cutting tip means for use in said inverted position of said knife for piercing the skin of the animals or the carcasses by a forward movement of said knife with the wrist in the unbent position so that said cutting tip means is positioned under the skin adjacent to the facia, in said forward movement of said knife in said inverted position said handle means being gripped in an original position by the hand of the operator;

blunt edge means extending rearwardly from said cutting tip means along a first path at an acute angle relative to the longitudinal blade axis for engaging, in said inverted position of said knife, the facia to limit the movement of said cutting tip means toward the facia without cutting the facia, said unbent wrist and the forearm of the operator being generally parallel to said first path; and hook means located rearwardly of said cutting tip means and at least partially between said blunt edge means and the longitudinal blade axis for slitting the skin of the animal during rearward movement of the knife in said inverted position while said blunt edge means limits the movement of the cutting tip means toward the facia without cutting the facia, in the rearward movement of said inverted knife said handle means continuing to be gripped in said original position by the hand of the operator, said hook means having a hook edge extending along a second path generally parallel to said first path to position said hook edge above the skin, said second path extending beyond said hook edge and being adjacent to said upper portion of said handle means such that said upper portion is guided by the skin during said slitting.

4. A knife according to claim 3, further comprising:
said blade means further comprising a cutting edge having an arcuate section extending from said cutting tip means along an arcuate path, said arcuate path extending so that a tangent to said arcuate section adjacent to said cutting tip is generally parallel to said longitudinal handle axis so that said cutting tip means does not pierce the facia during the upward and downward cutting strokes.

* * * * *